(12) United States Patent
Horie

(10) Patent No.: US 11,600,195 B2
(45) Date of Patent: Mar. 7, 2023

(54) DIGITAL INPUT DEVICE, DIGITAL CORRECTION DEVICE AND DISTANCE LEARNING SYSTEM

(71) Applicant: Wacom Co., Ltd., Saitama (JP)

(72) Inventor: Toshihiko Horie, Saitama (JP)

(73) Assignee: Wacom Co., Ltd., Saitama (JP)

( * ) Notice: Subject to any disclaimer, the term of this patent is extended or adjusted under 35 U.S.C. 154(b) by 67 days.

(21) Appl. No.: 17/221,651

(22) Filed: Apr. 2, 2021

(65) Prior Publication Data
US 2021/0225189 A1    Jul. 22, 2021

Related U.S. Application Data

(63) Continuation of application No. 16/414,538, filed on May 16, 2019, now Pat. No. 10,977,955, which is a
(Continued)

(30) Foreign Application Priority Data

Nov. 18, 2016 (JP) .............................. JP2016-225071

(51) Int. Cl.
*G09B 7/02* (2006.01)
*G06F 3/041* (2006.01)
(Continued)

(52) U.S. Cl.
CPC ............. *G09B 7/02* (2013.01); *G06F 3/0227* (2013.01); *G06F 3/03545* (2013.01);
(Continued)

(58) Field of Classification Search
CPC ... G09B 7/02; G09B 5/02; G09B 5/14; G09B 19/00; G09B 19/025; G06F 3/04162;
(Continued)

(56) References Cited

U.S. PATENT DOCUMENTS

2006/0154559 A1*  7/2006 Yoshida .............. A63F 3/00643
                                                                446/297
2015/0016726 A1    1/2015 Sugiura et al.
(Continued)

FOREIGN PATENT DOCUMENTS

CN            1695156 A      11/2005
JP      2006-190270 A       7/2006
(Continued)

OTHER PUBLICATIONS

Chinese Office Action, dated Nov. 30, 2020, for Chinese Application No. 201780071261.4, 10 pages.
(Continued)

*Primary Examiner* — Temesghen Ghebretinsae
*Assistant Examiner* — Sosina Abebe
(74) *Attorney, Agent, or Firm* — Seed IP Law Group LLP

(57) ABSTRACT

A digital input device includes a sensor that detects an electronic pen and outputs coordinates according to positions pointed by the electronic pen, a display device, an operation button, a processor, and a storage device storing a program that causes the digital input device to: display, on the display device, a predetermined template according to a format indicated by template data and inputted information according to the position pointed by the electronic pen and received via the sensor; provide timepoint information at each timepoint, generate pieces of time-series data based on the timepoint information provided at each timepoint, each of the pieces of the time-series data including: a timepoint value indicated by the timepoint information, coordinate values indicated by the coordinates output from the sensor, a writing pressure value, and a button status value; and store answer information and correction information in association with the template data indicating the format.

13 Claims, 18 Drawing Sheets

Related U.S. Application Data continuation of application No. PCT/JP2017/039031, filed on Oct. 30, 2017.

(51) Int. Cl.

| | |
|---|---|
| *G06F 3/02* | (2006.01) |
| *G06F 3/0354* | (2013.01) |
| *G06F 3/0481* | (2022.01) |
| *G06F 3/04883* | (2022.01) |
| *G09B 19/02* | (2006.01) |
| *G06F 3/0488* | (2022.01) |
| *G09B 5/14* | (2006.01) |
| *G09B 19/00* | (2006.01) |
| *G09B 5/02* | (2006.01) |

(52) U.S. Cl.
CPC .......... *G06F 3/0481* (2013.01); *G06F 3/0488* (2013.01); *G06F 3/04162* (2019.05); *G06F 3/04883* (2013.01); *G09B 5/02* (2013.01); *G09B 5/14* (2013.01); *G09B 19/00* (2013.01); *G09B 19/025* (2013.01)

(58) Field of Classification Search
CPC .. G06F 3/0227; G06F 3/03545; G06F 3/0481; G06F 3/04883; G06F 3/0488
See application file for complete search history.

(56) References Cited

U.S. PATENT DOCUMENTS

| | | | |
|---|---|---|---|
| 2015/0310756 A1* | 10/2015 | Nakamura | G06Q 90/00 434/362 |
| 2015/0336421 A1 | 11/2015 | Neubauer | |

FOREIGN PATENT DOCUMENTS

| | | | |
|---|---|---|---|
| JP | 2012-198363 A | | 10/2012 |
| JP | 2013145265 A | | 7/2013 |
| JP | 2013-156788 A | | 8/2013 |
| JP | 2014-215334 A | | 11/2014 |
| JP | 2014215334 A | * | 11/2014 |
| JP | 2015-049306 A | | 3/2015 |
| JP | 2015049306 A | * | 3/2015 |
| JP | 2015-102556 A | | 6/2015 |
| JP | 2016091347 A | | 5/2016 |

OTHER PUBLICATIONS

Japanese Office Action, dated May 25, 2022, for Japanese Application No. 2018-551554, 6 pages (with English-language translation).

* cited by examiner

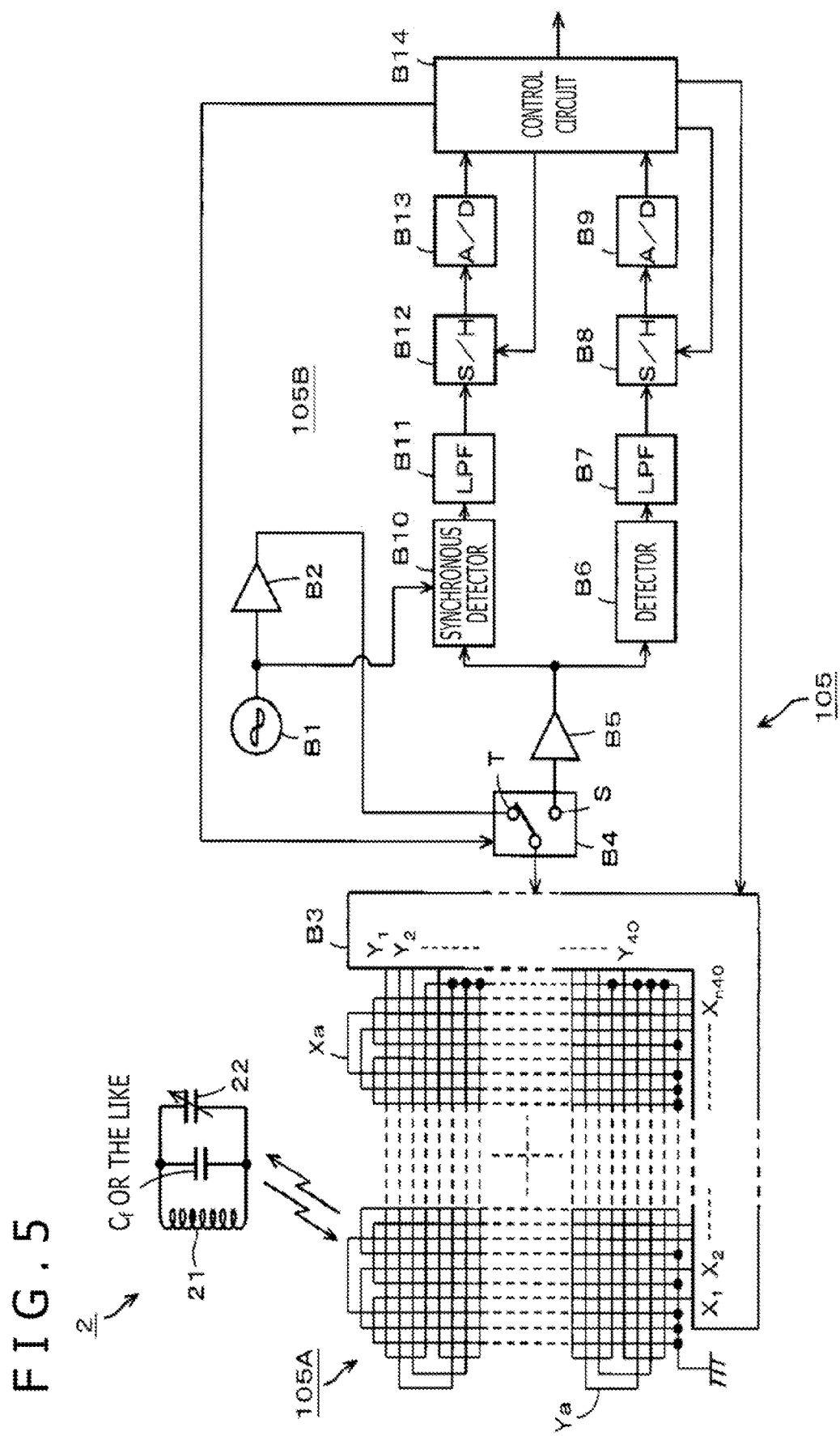

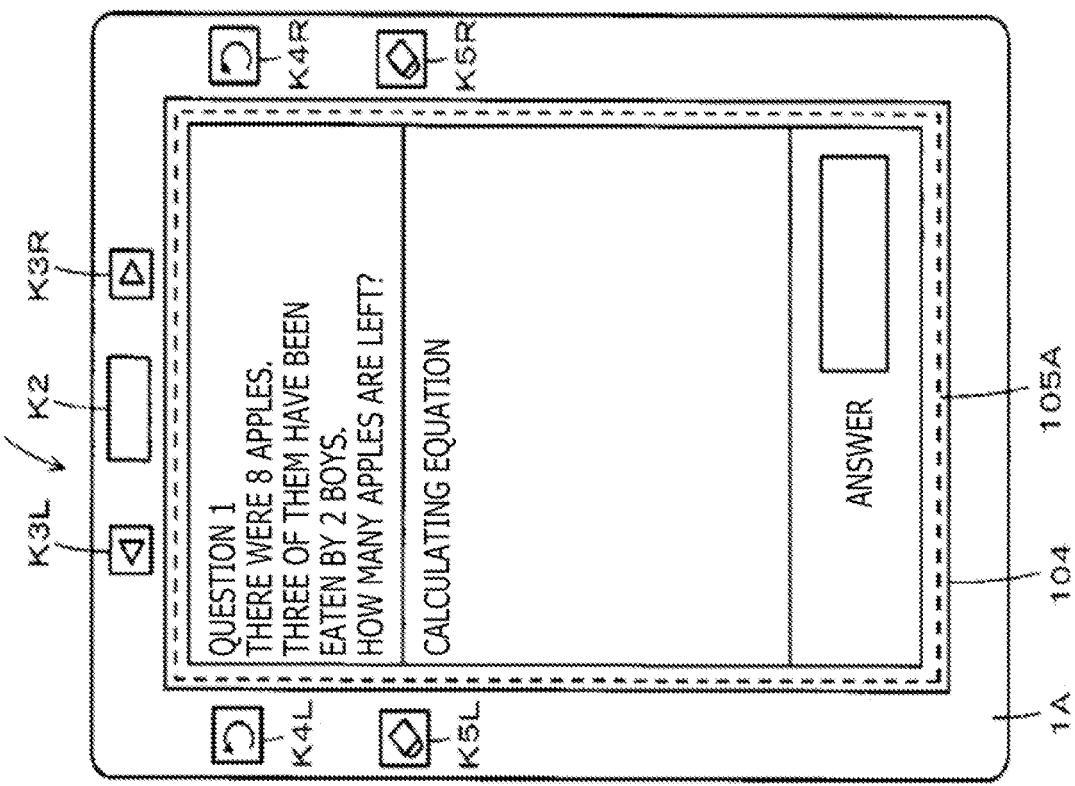
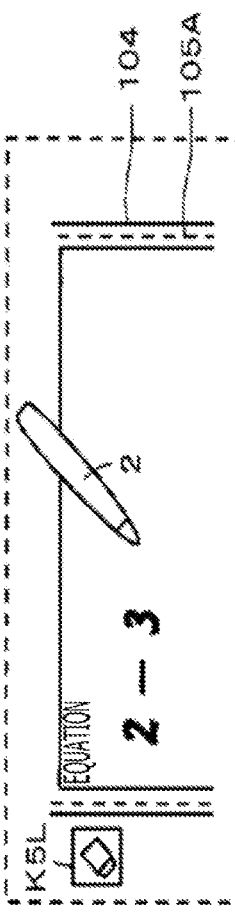
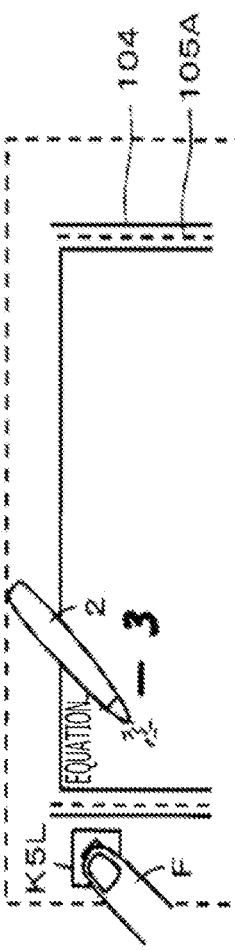
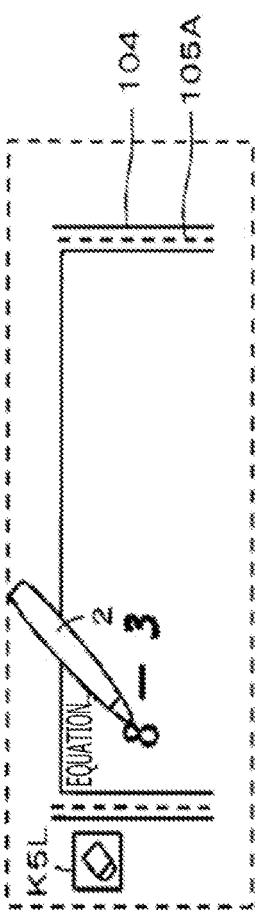

FIG.7

| OPERATION INPUT | INPUTTED TIME-SERIES DATA | DISPLAY |
|---|---|---|
| t1 2 t5 | t1 X1 Y1 P1 S1<br>t2 X2 Y2 P2 S2<br>t3 X3 Y3 P3 S3<br>t4 X4 Y4 P4 S4<br>t5 X5 Y5 P5 S5 | 2 |
|  | t6 X6 Y6 P6 S6 |  |
| t7 — t9 | t7 X7 Y7 P7 S7<br>t8 X8 Y8 P8 S8<br>t9 X9 Y9 P9 S9 | 2 — |
|  | t10 X10 Y10 P10 S10 |  |
| t11 3 t15 | t11 X11 Y11 P11 S11<br>t12 X12 Y12 P12 S12<br>t13 X13 Y13 P13 S13<br>t14 X14 Y14 P14 S14<br>t15 X15 Y15 P15 S15 | 2 − 3 |
|  | t16 X16 Y16 P16 S16 |  |
| t17 2 t21 | t17 X17 Y17 P17 S17<br>t18 X18 Y18 P18 S18<br>t19 X19 Y19 P19 S19<br>t20 X20 Y20 P20 S20<br>t21 X21 Y21 P21 S21 | ☐ − 3 |
|  | t22 X22 Y22 P22 S22 |  |
| t23 8 t27 | t23 X23 Y23 P23 S23<br>t24 X24 Y24 P24 S24<br>t25 X25 Y25 P25 S25<br>t26 X26 Y26 P26 S26<br>t27 X27 Y27 P27 S27 | 8 − 3 |

- tn — TIMEPOINT
- Xn — X-COORDINATE
- Yn — Y-COORDINATE
- Pn — WRITING PRESSURE
- Sn — BUTTON STATUS

| EXAMINATION VENUE | TOKYO | SUBJECT | MATHEMATICS |
|---|---|---|---|
| CANDIDATE NO. | 123456 | NAME | ○○○○○ |

QUESTION 1
$(t1, X1, Y1, P1, S1)(t2, X2, Y2, P2, S2)\cdots\cdots\cdots$

ANSWER SHEET FORMAT 1 & QUESTION 1

FIG. 9

| OPERATION INPUT | INPUTTED TIME-SERIES DATA | DISPLAY |
|---|---|---|
| ![8] | t1 X1 Y1 P1 S1<br>t2 X2 Y2 P2 S2<br>t3 X3 Y3 P3 S3<br>t4 X4 Y4 P4 S4<br>t5 X5 Y5 P5 S5 | 8 |
|  | t6 X6 Y6 P6 S6 |  |
| ![→] | t7 X7 Y7 P7 S7<br>t8 X8 Y8 P8 S8<br>t9 X9 Y9 P9 S9 | 8 — |
|  | t10 X10 Y10 P10 S10 |  |
| ![2] | t11 X11 Y11 P11 S11<br>t12 X12 Y12 P12 S12<br>t13 X13 Y13 P13 S13<br>t14 X14 Y14 P14 S14<br>t15 X15 Y15 P15 S15 | 8 — 2 |
|  | t16 X16 Y16 P16 S16 |  |
| ![○] | t17 X17 Y17 P17 S17 | 8 — ▢ |
|  | t18 X18 Y18 P18 S18 |  |
| ![3] | t19 X19 Y19 P19 S19<br>t20 X20 Y20 P20 S20<br>t21 X21 Y21 P21 S21<br>t22 X22 Y22 P22 S22<br>t23 X23 Y23 P23 S23 | 8 — 3 |

FIG.12
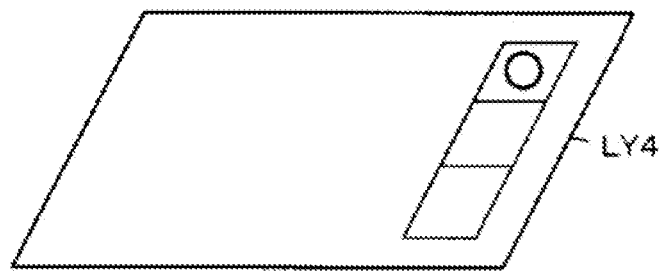
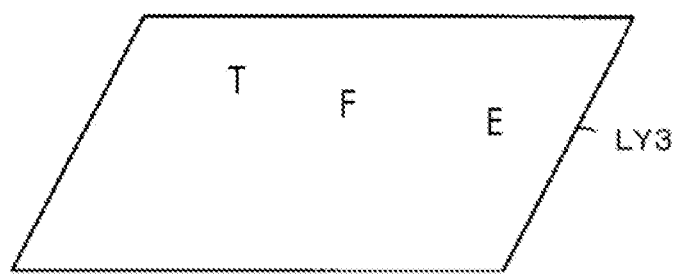
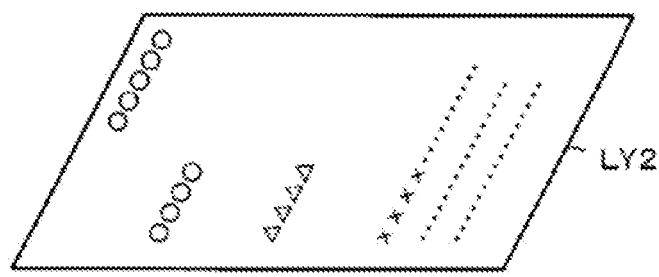
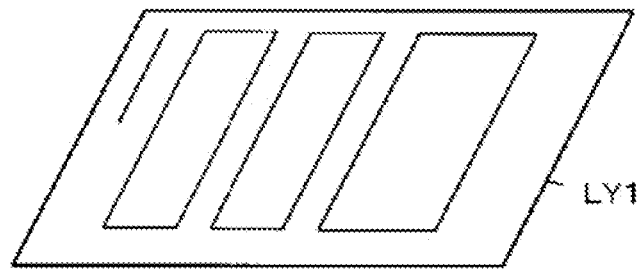

FIG.15

| STUDENT NO. | xxxxx | NAME | ○○○○○ | SUBJECT | MATHEMATICS |
|---|---|---|---|---|---|
| ANSWER INFORMATION (INFORMATION OF ANSWER LAYER) ||||||
| ANSWER SHEET FORMAT (INFORMATION OF ANSWER SHEET FORMAT LAYER) ||||||
| CORRECTION INFORMATION (INFORMATION OF MARK LAYER) ||||||
| SEAL INFORMATION (INFORMATION OF SEAL LAYER) ||||||

FIG. 18A

| CANDIDATE NO. | SUBJECT | PAGE NO. | INPUTTED TIME-SERIES DATA ON THE PAGE | ANSWER SHEET FORMAT FOR THE PAGE |
|---|---|---|---|---|

FIG. 18B

| CANDIDATE NO. | SUBJECT | PAGE NO. | INPUTTED TIME-SERIES DATA ON THE PAGE | ANSWER SHEET FORMAT FOR PAGE 1 |
|---|---|---|---|---|
| 123456 | MATHEMATICS | 1 | $(t1, X1, Y1, P1, S1), \cdots$ | |

FIG. 18C

| CANDIDATE NO. | SUBJECT | PAGE NO. | INPUTTED TIME-SERIES DATA ON THE PAGE | ANSWER SHEET FORMAT FOR PAGE 2 |
|---|---|---|---|---|
| 123456 | MATHEMATICS | 2 | $(ta, Xa, Ya, Pa, Sa), \cdots$ | |

FIG. 18D

| CANDIDATE NO. | SUBJECT | PAGE NO. | INPUTTED TIME-SERIES DATA ON THE PAGE | ANSWER SHEET FORMAT FOR PAGE 3 |
|---|---|---|---|---|
| 123456 | MATHEMATICS | 3 | $(tb, Xb, Yb, Pb, Sb), \cdots$ | |

DIGITAL INPUT DEVICE, DIGITAL CORRECTION DEVICE AND DISTANCE LEARNING SYSTEM

BACKGROUND

Technical Field

The present disclosure relates to an input device that enables to input digital data by using an electronic pen and a position detection device and also to a system constructed using this input device, and particularly to devices and a system, which are suited for use in large-scale examinations such as admission examinations or distance learning for individuals.

Background Art

Various large-scale examinations, each of which a number of candidates take, led by admission examinations to junior high schools, high schools, colleges and universities and including various certification examinations, qualifying examinations, and the like are conducted. In such a large-scale examination, it has heretofore been a common practice to conduct the examination by distributing question sheets and blank answer sheets to each candidate, to collect and mark the answer sheets with answers filled in by the candidate, and then to make a pass/fail determination according the results of the marking. In examinations taken by a large number of candidates such as a so-called national center test that is a nationally-administered admission examination held by the National Center for University Entrance Examinations, a scantron-based examination which enables marking processing by a computer is often conducted to make the marking promptly, exactly and fairly.

In a scantron-based examination, each candidate chooses, out of a plurality of options provided beforehand with respect to each question, one or more options considered to be a correct answer or correct answers, and make an answer by filling, with a pencil or the like, an answer box or answer boxes corresponding to the option or options thus chosen. This means that, because only the answer is filled in, the process of calculation to the answer cannot be subjected to marking in the case of scientific subjects and text writing skills cannot be subjected to marking in the case of subjects in arts.

Like the examinations that have been conventionally conducted, it is obviously possible to make the candidate write not only an answer but also the process of calculation on an answer sheet or to make the candidate write a text on the answer sheet. In this case, however, larger space and greater cost are needed for the storage of answer sheets as the number of candidates increases. Further, the possibility arises that the answer sheets can be spoiled or torn. In addition, there may be a situation where a desire exists to include questions, which a grader marker marks while taking the candidate's thought process into consideration, together with questions, which allow automated marking by a computer.

It is, therefore, contemplated to use, like the education support program or education support device of the invention disclosed in JP 2015-102556 A, an electronic device, such as a personal computer, smartphone or tablet computer having a pen input panel, for making answers. The term "pen input panel" as used herein means an electronic component including a display device and a so-called touch sensor in combination, and the use of an electronic pen allows a candidate to write and input calculating equations and texts.

Answer information inputted via such a pen input panel can be dealt with as electronic data, so that neither the problem of storing answer sheets nor the problem of spoiling or tearing answer sheets arises. In addition, the answer information can be dealt with as electronic data, so that calculating equations, texts, and the like can be marked by a grade marker while taking the candidate's thought process into consideration. Furthermore, in the case of questions, which require choosing correct options, or the like, automated marking by a computer is feasible.

In the case of a system that uses the above-mentioned electronic device, which has the pen input panel, as a device for inputting answers, a problem may arise if a correction is made to once-inputted answer information. More specifically, the answer information has been inputted on the pen input panel by using an electronic pen, so that, for rewriting the answer, the answer information which has been inputted has to be erased first. For erasing the answer information which has been inputted, an erase instructing device (erasing electronic pen) is needed to supply signals, which are different from those inputted at the time of input of the answers, to the pen input panel.

This erasing electronic pen may be configured as a discrete element from the answering electronic pen, or a single electronic pen may be configured as an answering electronic pen at an end portion thereof and as an erasing electronic pen at an opposite end portion thereof. Such a configuration involves a potential problem that a candidate may use the erasing electronic pen instead of the erasing electronic pen by mistake or the other way round. Therefore, the candidate must always discern the answering electronic pen and the erasing electronic pen, and must use them separately. This is irksome. Moreover, an interference may be considered to occur with a line of thought upon replacing the answering electronic pen with the erasing electronic pen or the way round.

When there is a plurality of questions, more appropriate and accurate marking can be made if a grader marker not only can read the completed answer results but also can find out, as needed, from which question the candidate began to answer and/or where and how the candidate made a correction. Moreover, detailed reproduction, if possible, of the process of answering by each candidate enables to provide a more appropriate guidance not only in a large-scale examination such as an admission examination, certification examination or qualifying examination but also in a distance learning held for individuals.

BRIEF SUMMARY

In view of this, it is an object of the present disclosure to enable simple and appropriate input and correction of digital data and simple reproduction of the process of creation (the process of input) of the inputted digital data when an input device capable of inputting the digital data with an electronic pen and a position detection device are used.

To solve the problems described above, the present disclosure provides a digital input device including a sensor which, in operation, detects coordinates according to a position pointed by an electronic pen, a display device disposed on a lower side or upper side of the sensor, at least one operation button, at least one processor, at least one storage device storing at least one program that, when executed by the at least one processor, causes the digital input device to: display, on the display device, a predetermined template and inputted information according to the position pointed by the electronic pen and received via the sensor, provide timepoint information at every predetermined timing, generate time-series data with pointed position information from the sensor according to pointing to the template by the electronic pen, the time-series data including information regarding the electronic pen that is received from the electronic pen associated with operation information indicating a state of the at least one operation button, at timepoints indicated by the timepoint information, and store the time-series data.

According to the digital input device of this disclosure, a pen input panel is constructed of the sensor and the display device, and on the display device, the predetermined template and the inputted information by the electronic pen as received via the sensor are displayed. The digital input device includes the at least one operation button and provides timepoint information at every predetermined timing.

Time-series data is generated with pointed position information from the sensor according to pointing to the template by the electronic pen, the time-series data including information regarding the electronic pen that is received from the electronic pen associated with operation information indicating a state of the at least one operation button, all of which are at timepoints indicated by the timepoint information. The time-series data so generated and the template are stored in association with each other. The time-series data is inputted information by a user to the corresponding template, and is to be used as electronic data (digital data).

Because operation information that indicates the state of the at least one operation button is also included in the time-series data, it is programmed such that, based on the state of the at least one operation button, an operation input by the electronic pen can be regarded to be an inputting operation or an erasing operation. In other words, it is programmed such that, despite an operation by the same electronic pen, the function of the operation can be switched according to the state of the at least one operation button.

BRIEF DESCRIPTION OF THE DRAWINGS

FIG. 5 is a block diagram for describing a configuration example of a position detection device mounted on the digital answer device in the first embodiment of the present disclosure;

FIGS. 6A to 6D are illustrations for making a description on an inputting operation of an answer to the digital answer device in the first embodiment of the present disclosure;

FIG. 7 depicts a table for describing an example of answer information to be generated as time-series data at the digital answer device in the first embodiment of the present disclosure;

FIG. 9 depicts a table for describing another example of answer information to be generated as time-series data at the digital answer device in the first embodiment of the present disclosure;

FIG. 12 is an illustration for making a description on a layered structure of data to be processed by the distance learning system according to the second embodiment of the present disclosure;

FIG. 15 depicts a table for describing an example of transmittal correction information to be generated at the digital correction device in the second embodiment of the present disclosure;

FIGS. 18A to 18D illustrate different rows of a table for describing a configuration example of page-by-page answer information if an answer sheet format spans a plurality of pages.

DETAILED DESCRIPTION

Figure 1:
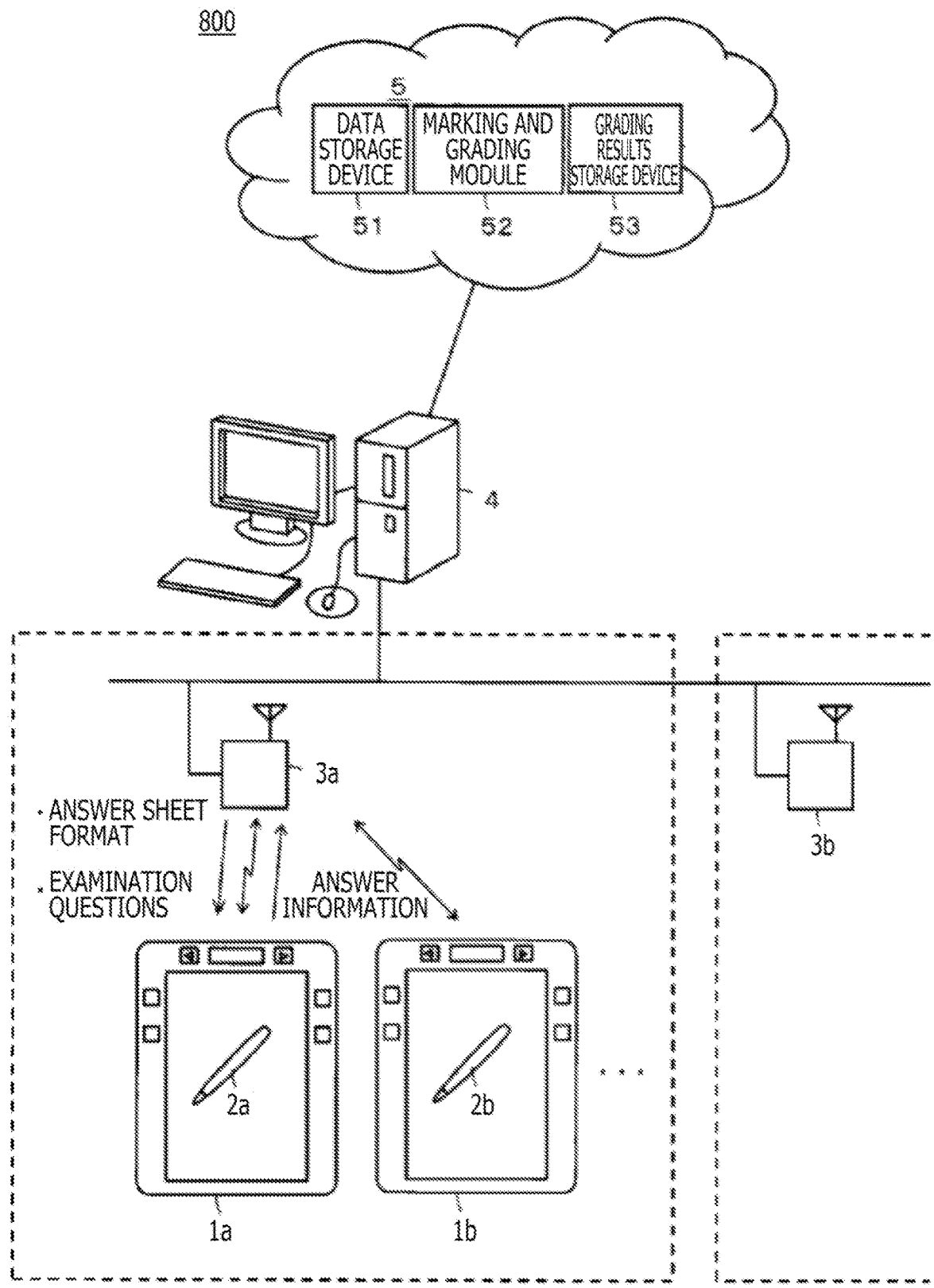
FIG. 1 is an illustration for describing an outline of a large-scale examination system according to a first embodiment of the present disclosure.

Referring to the drawings, a description will hereinafter be made about embodiments of devices and system according to the present disclosure. Specifically, a description will hereinafter be made about a first embodiment as an example of the present disclosure as applied to a large-scale examination system and a second embodiment as an example of the present disclosure as applied to a distance learning system.

First Embodiment (Large-Scale Examination System)

FIG. 1 is an illustration for describing an outline of the large-scale examination system according to the first embodiment. In the first embodiment, the large-scale examination system 800 is constructed and used when a large number of candidates gather at one or more examination venues and take an examination there as in an admission examination to a junior high school, high school, college or university or a certification examination, qualifying examination or the like.

As illustrated in FIG. 1, the large-scale examination system of the first embodiment includes digital answer devices 1a, 1b and so on, electronic pens 2a, 2b and so on, access points (hereinafter abbreviated as "APs") 3a, 3b and so on, a host computer 4, and a cloud system 5. Each of the digital answer devices 1a, 1b and so on and each of the electronic pens 2a, 2b and so on are used by each candidate who takes the examination. In this first embodiment, the organizer of the examination lends them to the candidates, and collects them from the candidates after the end of the examination.

The APs 3a, 3b and so on are each arranged in a classroom, lecture hall, auditorium or the like that is used as an examination venue, and enables wireless communication with the digital answer devices 1a, 1b and so on. At least one host computer 4 is arranged at each of one or more examination venues. The host computer 4 performs communication with the digital answer devices 1a, 1b and so on via the APs 3a, 3b and so on, respectively, to conduct the distribution of an answer sheet format and examination questions and the collection of answer information. The cloud system 5 includes a storage device for various data and a control circuit that performs marking and grading of answers.

In recent years, cloud computing systems are widely used to provide users with use rights or the like for software and hardware as services over networks. A data center or a group of servers, which is arranged on the Internet to realize such cloud computing systems, is called a "cloud."

In other words, a cloud provides each user with his or her desired software, hardware and the like without making him or her aware of any real server. In this embodiment, a data storage device 51, a marking and grading module 52, and a grading results storage device 53 are arranged as the cloud system 5 on the cloud as illustrated in FIG. 1.

The data storage device 51 in the cloud system 5 includes a storage area to be provided, such as an answer sheet format and examination questions, and another storage area for answer information collected from the individual digital answer devices 1a, 1b and so on. According to a request from the host computer 4 arranged at each examination venue, the cloud system 5 reads the answer sheet format and examination questions from the data storage device 51, and distributes them to the host computer 4 at the requestor venue.

The host computer 4 wirelessly distributes the answer sheet format and examination question to the individual digital answer devices 1a, 1b and so on via the Aps 3a, 3b and so on, respectively. In the large-scale examination system of the first embodiment, the host computer 4 is programmed such that the timings of the start and end of display of the answer sheet format and examination questions can be controlled to the individual digital answer devices 1a, 1b and so on. As a consequence, it is possible to prevent unfair answering such as beginning to answer before the staring time of the examination or continuing to answer after the ending time of the examination.

As an alternative, the answer sheet format and examination questions are distributed beforehand to the individual digital answer devices 1a, 1b and so on, and according to instructions for starting by a proctor, the candidates turn on the power supply to the individual digital answer devices 1a, 1b and so on. As a consequence, the answer sheet format and examination questions are displayed on the individual digital answer devices 1a, 1b and so on, and the candidates can then perform inputting of answers.

Through the digital answer devices 1a, 1b and so on lent to the individual candidates, they display and read the examination questions and think about answers. To the answer sheet format displayed on the own digital answer devices 1a, 1b and so on, the individual candidates then input their answers by using their own electronic pens 2a, 2b and so on. Answer information inputted as described above are accumulated in memories in the own digital answer devices 1a, 1b and so on, respectively. After the expiration of the examination time, a submit operation is performed, whereby the answer information is submitted to the host computer 4. The host computer 4 collects the answer information from the individual answer devices 1a, 1b and so on, and stores and holds it.

In the large-scale examination system of the first embodiment, the host computer 4 sends the collected answer information of the respective candidates to the cloud system 5. The cloud system 5 receives the answer information from the host computers 4 at the individual examination venues, and stores it in the storage area for answer information in the data storage device 51. Subsequently, the marking and grading module 52 of the cloud system 5 functions so as to mark and grade the answer information stored in the storage area for answer information in the data storage device module 51, create grading results, and store them in the grading results storage device 53.

If the grading results lead to more successful candidates than the admission quota or conversely to less successful candidates than the admission quota, the grader markers can review the answer information again and can adjust the successful candidates. As will be described in detail subsequently herein, the answer information is created as time-series data in this case such that the status of answering can be precisely reproduced. As a consequence, detailed grading can be made by reproducing the process of answering in detail and, for example, finding out candidates who carefully thought about the answers and conversely to find out candidates who were rough in the process of answering and happened to have led to the correct answers by accident.

In this manner, those who are responsive, such as grader markers, can determine finally successful candidates after checking the answer information finely and appropriately grasping the thought process and the depth of understanding. The cloud system 5 can then issue and mail an admission certificate to each successful candidate based on the stored data in the grading results storage device 53.

The large-scale examination system of the first embodiment has an important feature in the digital answer devices 1a, 1b and so on. The digital answer devices 1a, 1b and so on in the first embodiment need to input answers with the electronic pens 2a, 2b and so on, respectively, but are configured such that, if answered incorrectly, incorrect portions can be easily and appropriately erased and correct answers can be inputted instead.

In addition, the digital answer devices 1a, 1b and so on in the first embodiment are each configured such that the status of answering can be precisely reproduced by finely creating the answer information as time-series data. As a consequence, it is configured, as also mentioned above, to enable detailed grading by reproducing the process of answering in detail and, for example, finding out candidates who carefully thought about the answers and to find out candidates who were conversely rough in the process of answering and happened to have led to the correct answers by accident.

A description will hereinafter be made about details of the digital answer devices 1a, 1b and so on in the first embodiment. The digital answer devices 1a, 1b and so on each have a similar configuration. Therefore, the digital answer devices 1a, 1b and so on will hereinafter be collectively called "the digital answer device 1" except where needed to specifically distinguish and indicate them. Similarly, the electronic pens 2a, 2b and so on each have a similar configuration, and therefore the electronic pens 2a, 2b and so on will hereinafter be collectively called "the electronic pen 2" except where needed to specifically distinguish and indicate them.

[Details of Digital Answer Device 1]

Figure 2:
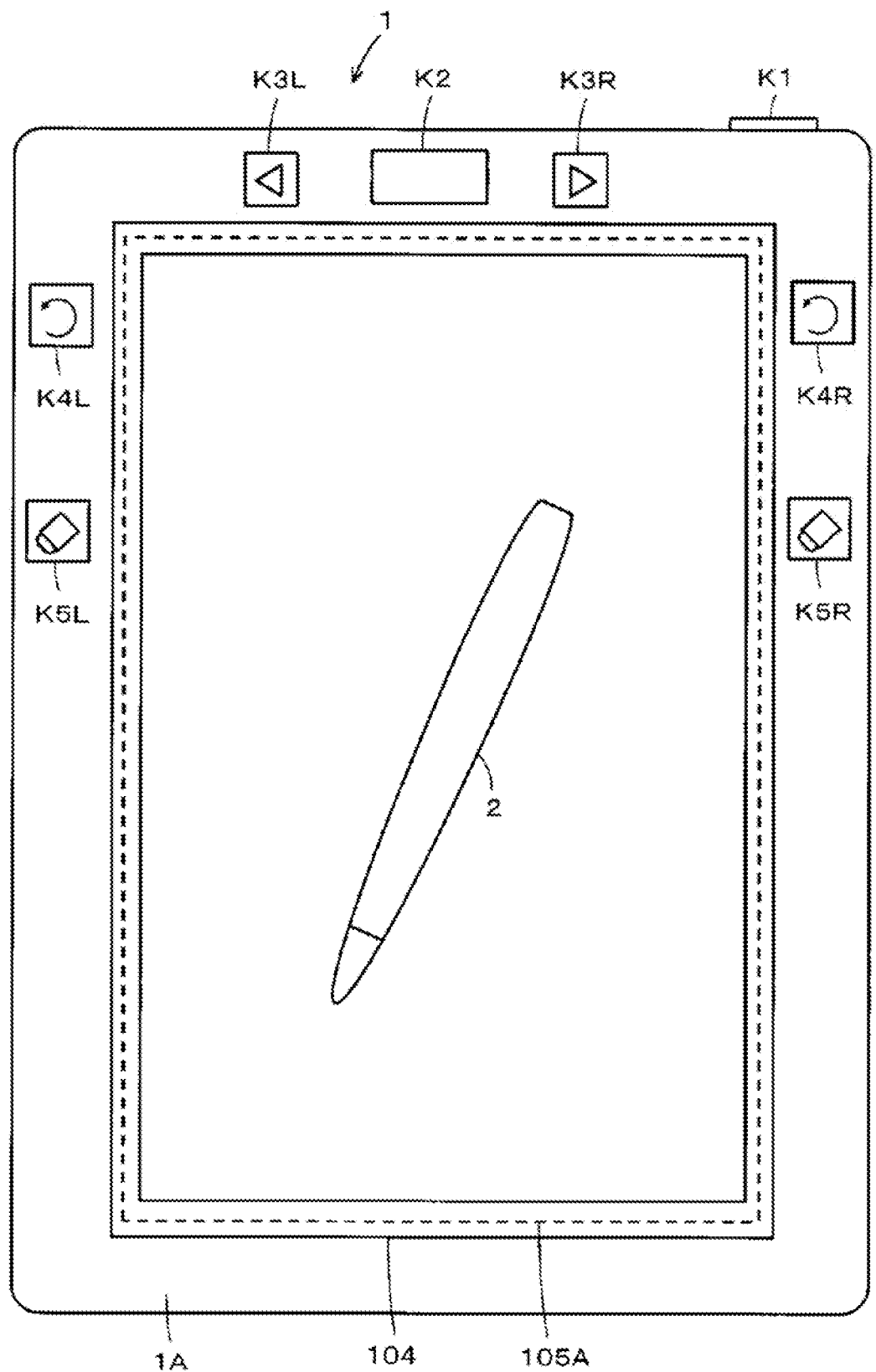
FIG. 2 is an external view for describing an external appearance of a digital answer device in the large-scale examination system according to the first embodiment of the present disclosure.

FIG. 2 is an external view for describing an external appearance of the digital answer device 1 in the large-scale examination system according to the first embodiment. As illustrated in FIG. 2, the digital answer device 1 has the shape of a so-called tablet personal computer (PC), and a power button K1 is disposed in a right upper side wall portion. Further, the digital answer device 1 includes a display device 104 having a display screen of the A4 size. Under the display device 104, a position detection sensor 105A is disposed facing the entire surface of the display screen of the display device 104. As a consequence, various information such as characters, symbols and figures can be inputted by handwriting, specifically by bringing the electronic pen 2 in contact with the display screen of the display device 104 to operate.

Surrounding the display screen of the display device 104, a bezel portion formed by a front panel 1A is disposed. In an upper part of the bezel portion, a submit button K2, a rightward page change button K3R and a leftward page change button K3L are disposed. On a right side portion of the bezel portion, a back button (right) K4R and an eraser button (right) K5R are disposed. On a left side portion of the bezel portion, a back button (left) K4L and an eraser button (left) K5L are disposed. The back button (right) K4R and eraser button (right) K5R are operating devices for a left-handed user, while the back button (left) K4L and eraser button (left) K5L are operating devices for a right-handed user.

The power button K1 is an operating device for turning on or off a power supply, and the submit button K2 is an operation button to be operated when desired to submit (send) a series of answer information, which has been inputted to examination questions, to the host computer 4. The rightward page change button K3R and leftward page change button K3L are operating devices for performing page feeding in directions indicated by arrows, respectively. The back button (right) K4R and back button (left) K4L are each an operating device for canceling immediately preceding inputted information to return to the last input state. The eraser button (right) K5R and eraser button (left) K5L are configured such that, while one of them is depressed, any operation to the position detection sensor 105A by the electronic pen 2 is processed as an erasing operation for inputted information.

Figure 3:
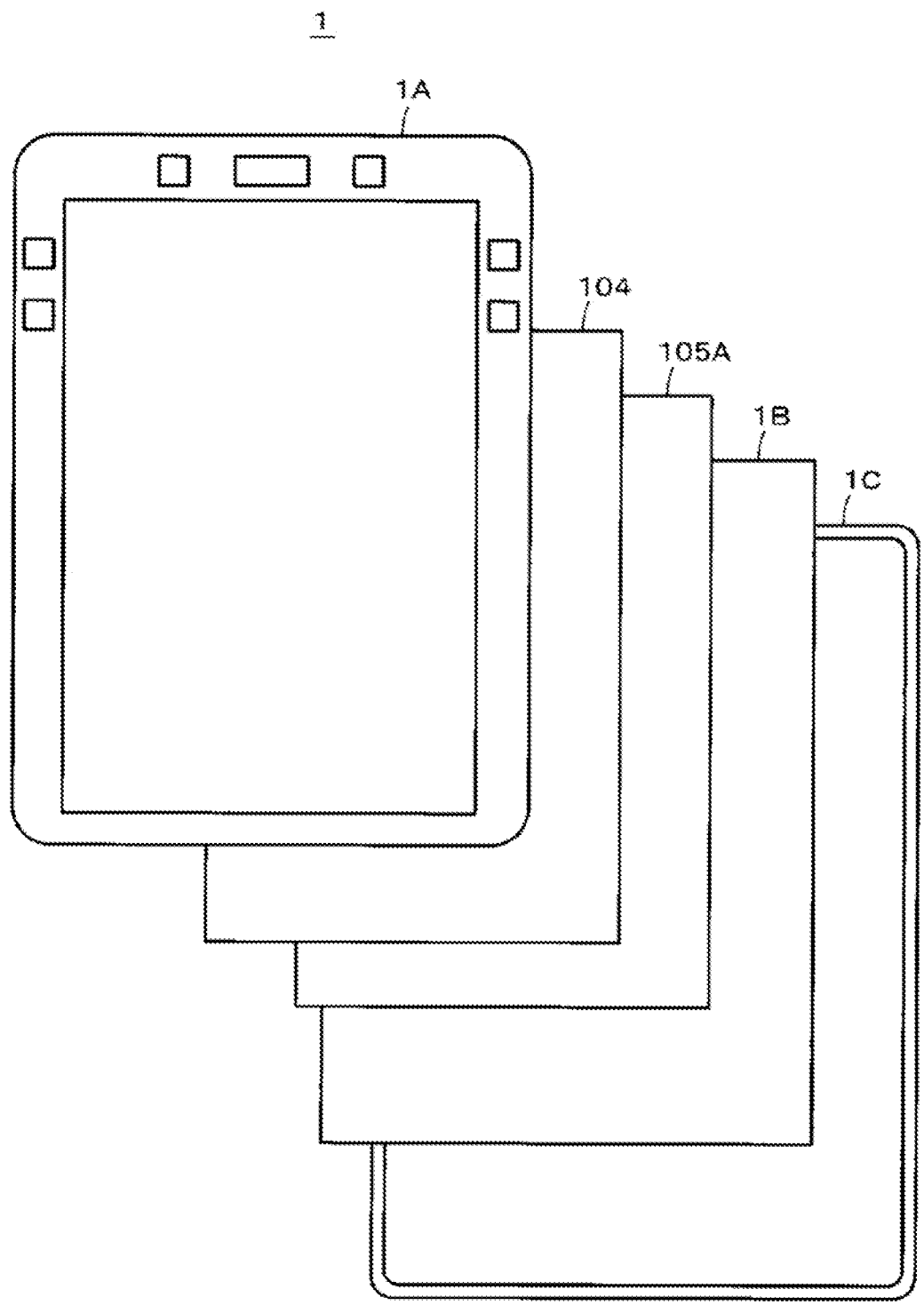
FIG. 3 is an illustration for describing an outline of the digital answer device in the large-scale examination system according to the first embodiment of the present disclosure.

FIG. 3 is an illustration for describing an outline of the digital answer device 1 having the external appearance illustrated in FIG. 2. As depicted in FIG. 3, the digital answer device 1 has a configuration in which a circuit board 1B, the position detection sensor 105A and the display device 104 are stacked from the bottom in this order inside a casing 1C and are sealed by the front panel 1A. The front panel 1A defines an opening at an area facing the display screen of the display device 104, and the opening is fitted, for example, with a protective glass, so that the display screen of the display device 104 is protected.

Figure 4:
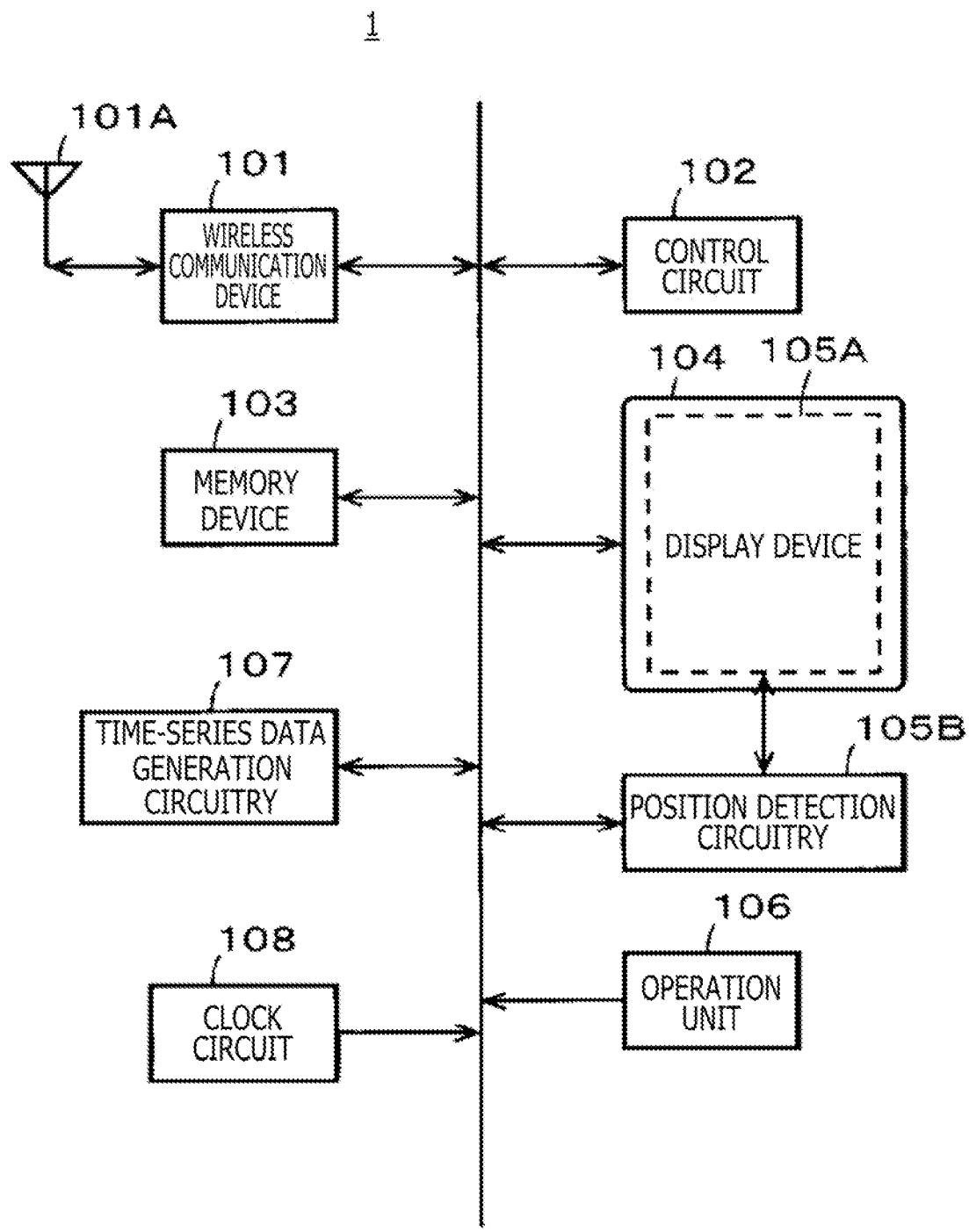
FIG. 4 is a block diagram for describing a configuration example of the digital answer device in the first embodiment of the present disclosure.

FIG. 4 is a block diagram for describing a configuration example of the digital answer device 1. A sending and receiving antenna 101A and a wireless communication device 101 are elements that realize wireless communication functions. The wireless communication functions realized by these elements enable mutual wireless communication between the digital answer devices 1a, 1b and so on and the host computer 4 via the APs 3a, 3b and so on, for example, by a wireless local area network (LAN) of the Wi-Fi (registered trade mark) specification.

Although not illustrated in the figure, a control circuit 102 is a computer device configured of a central processing unit (CPU), a read only memory (ROM), a random access memory (RAM), a nonvolatile memory such as, for example, a flash memory, and the like, all of which are connected together via a bus. The control circuit 102 realizes functions that control individual elements of the digital answer device 1. A memory device 103 includes one or both of an internal memory and an external memory, and is programmed to enable the writing and reading of various pieces of information such as, for example, the answer sheet format and answer information in or from these memories under control of the control circuit 102.

The internal memory mounted on the memory device 103 includes a flash memory, an electrically erasable programmable ROM (EEPROM), or the like, for example. An external memory detachably inserted in the memory device 103 includes, on the other hand, various external memories such as universal serial bus (USB) memories, secure digital (SD) card memories and upper class SD card memories for use.

If configured to include both an internal memory and an external memory connected to the memory device 103, they can be used separately such that they store different kinds of information, respectively. It is also possible to use the internal memory and the external memory in such a manner that the same information is stored in both the internal memory and the external memory, the data stored in the internal memory is used by the organizer side of the examination, and the external memory is removed, taken back home and used by the candidate who used the digital answer device 1 to take the examination.

The display device 104 is an element configured, for example, of a thin display device such as a liquid crystal display (LCD) or an organic electroluminescence (EL) display and a display-processing circuitry. On the display device 104, the answer sheet format and examination questions, and further, the candidate's No., name, answer information and the like inputted by the candidate (user) can be displayed under control of the control circuit 102.

The position detection sensor 105A and a position detection circuitry 105B make up a position detection device 105. In this embodiment, the position detection device 105 is of the Electro Magnetic Resonance (EMR) (registered trademark) type, in other words, an electromagnetic induction exchange type. Position detection devices include those of an electrostatic capacitance type. In the case of the position detection device of the electrostatic capacitance type, however, it is also possible to point and input by a user's finger or the like. There is hence a possibility that the frequency of occurrence of input errors may become higher. In the digital answer device 1, the position detection device 105 of the electromagnetic induction exchange type is adopted accordingly. A description will be made subsequently herein about a configuration example of the position detection device 105 of the electromagnetic induction exchange type.

An operation unit 106, as already mentioned above, includes the power button K1, submit button K2, rightward page change button K3R, leftward page change button K3L, back button (right) K4R, back button (left) K4L, eraser button (right) K5R and eraser button (left) K5L. If these operation buttons are operated, signals that correspond to the operated buttons can be supplied to the control circuit 102 or time-series data generation circuitry 107.

According to inputting operations performed to the position detection sensor 105A by the candidate and inputting operations to the individual operation buttons in the operation unit 106 by the candidate, the time-series data generation circuitry 107 performs processing to generate answer information as time-series data. A clock circuit 108 provides a timing at which answer information is formed as time-series data, for example, every 0.5 second, every one second, or the like. Besides this, the clock circuit 108 also has functions to provide current month/date/year, current weekday, and current time. Details of generation processing of time-series data at the time-series data generation circuitry 107 will be described subsequently herein. The time-series data generation circuitry 107 may be realized by the control circuit 102. The individual elements other than the display device 104 and position detection sensor 105A are disposed on the circuit board 1B depicted in FIG. 3.

FIG. 5 is a block diagram for describing configuration examples of the position detection device 105 of the electromagnetic induction exchange type mounted on the digital answer device 1 and the electronic pen 2.

The electronic pen 2 is represented as a circuit configuration by a resonant circuit formed of a coil 21 for signal sending and reception, a writing-pressure detector 22 connected to the coil 21, a resonant capacitor Cf connected in parallel to the writing-pressure detector 22, and so on. Therefore, the electronic pen 2 can point, to the position detection device 105, a position on the position detection sensor 105A and at the same time, can detect a writing pressure applied to the electronic pen 2 by the candidate at that moment and can notify the position detection device 105 of the writing pressure.

On the position detection device 105, on the other hand, the position (coordinates) detection sensor 105A of the electromagnetic induction exchange type is formed by arranging an X-axis loop coil group Xa and a Y-axis loop coil group Ya together in a stacked relationship. The loop coil groups Xa and Ya each consist of 40 rectangular loop coils. The individual loop coils that make up each loop coil group Xa or Ya are disposed in a juxtaposed relationship at equal intervals from each other and in a successively overlapping relationship with each other.

Further, the position detection device 105 is also provided with a selection circuit B3, to which the X-axis loop coil group Xa and Y-axis loop coil group Ya are connected. This selection circuit B3 successively selects the loop coils one by one in one of the two loop coil groups Xa and Ya.

Furthermore, the position detection device 105 is also provided with an oscillator B1, a current driver B2, a connection switching circuit B4, a reception amplifier B5, a detector B6, a low-pass filter B7, a sample-and-hold circuit B8, an A/D conversion circuit B9, a synchronous detector B10, a low-pass filter B11, a sample-and-hold circuit B12, an analog to digital (A/D) conversion circuit B13, and a control circuit B14 (e.g., CPU or microprocessor).

The oscillator B1 generates an alternating current (AC) signal of frequency f0, and supplies it to the current driver B2 and synchronous detector B10. The current driver B2 converts the AC signal, which has been supplied from the oscillator B1, to a current, and delivers it to the connection switching circuit B4. Under control from the control circuit B14 to be described subsequently herein, the connection switching circuit B4 switches a connection counterpart (a sending-side terminal T or a reception-side terminal S) to which the loop coil selected by the selection circuit B3 is to be connected. Of these connection counterparts, to the sending-side terminal T the current driver B2 is connected, and to the reception-side terminal S the reception amplifier B5 is connected.

An induced voltage generated in the loop coil selected by the selection circuit B3 is delivered to the reception amplifier B5 via the selection circuit B3 and connection switching circuit B4. The reception amplifier B5 amplifies the induced voltage supplied from the loop coil, and delivers it to the detector B6 and synchronous detector B10.

The detector B6 detects the induced voltage generated in the loop coil, in other words, the received signal, and delivers it to the low-pass filter B7. The low-pass filter B7 has a cutoff frequency sufficiently lower than the above-mentioned frequency f0, converts the output signal of the detector B6 to a direct current (DC) signal, and delivers it to the sample-and-hold circuit B8. The sample-and-hold circuit B8 holds a voltage value at a predetermined timing of an output signal from the low-pass filter B7, specifically at a predetermined timing during a reception period, and delivers it to the A/D conversion circuit B9. The A/D conversion circuit B9 converts the analog output of the sample-and-hold circuit B8 to a digital signal, and outputs it to the control circuit B14.

On the other hand, the synchronous detector B10 synchronously detects the output signal of the reception amplifier B5 by the AC current from the oscillator B1, and delivers a signal of a level, which corresponds to a phase difference between the output signal and the AC signal, to the low-pass filter B11. This low-pass filter B11 has a cutoff frequency sufficiently lower than the frequency f0, converts the output signal of the synchronous detector B10 to a DC signal, and delivers it to the sample-and-hold circuit B12. This sample-and-hold circuit B12 holds a voltage value at a predetermined timing of an output signal from the low-pass filter B11, and delivers it to the A/D conversion circuit B13. The A/D conversion circuit B13 converts the analog output of the sample-and-hold circuit B12 to a digital signal, and outputs it to the control circuit B14.

The control circuit B14 controls the individual elements of the position detection device 105. Specifically, the control circuit B14 controls the selection of the loop coil at the selection circuit B3, the switching of the connection switching circuit B4, and the timings of the sample-and-hold circuits B8 and B12. The control circuit B14 causes sending of radio waves with a fixed sending duration from the X-axis loop coil group Xa and Y-axis loop coil group Ya based on input signals from the A/D conversion circuits B9 and B13.

In the individual loop coils of the X-axis loop coil group Xa and Y-axis loop coil group Ya, induced voltages occur by a radio wave sent from the electronic pen 2. Based on the levels of the voltage values of the induced voltages occurred in the individual loop coils, the control circuit B14 calculates the coordinate values of the position in the X-axis direction and Y-axis direction as pointed by the electronic pen 2. The control circuit B14 also detects the writing pressure based on the phase difference between the sent radio wave and the received radio wave. As described above, the input device is constructed of the electronic pen 2 of the electromagnetic induction exchange type and the position detection device 105 of the electromagnetic induction exchange type illustrated in FIG. 5, in this embodiment.

[Input of Answer to Digital Answer Device 1 and Generation Processing of Answer Information]

Next, a description will be made about the manner of input of an answer by using the digital answer device 1 having the above-mentioned configuration and generation processing of answer information at the digital answer device 1. FIGS. 6A to 6D are illustrations for making a description on an inputting operation of the answer to the digital answer device 1 in the first embodiment.

As mentioned above, the digital answer device 1 receives the answer sheet format and examination questions sent from the host computer 4, and stores them in the nonvolatile memory in the control circuit 102. The control circuit 102 then supplies the answer sheet format and examination question, which are stored in the nonvolatile memory, to the display device 104, and as illustrated in FIG. 6A, displays an answer box according to the answer sheet format and the examination question on the display screen of the display device 104.

The candidate reads the examination question displayed on the display device 104, and inputs an answer with the electronic pen 2 in the answer box which is also displayed on the display device 104. For the sake of simplification of the description, the example illustrated in FIG. 6A represents a case in which a mathematics examination question for first to third graders in elementary school has been presented. It is a matter of course that various kinds of questions are to be presented according to a target candidate who takes an examination to be conducted.

As illustrated in FIG. 6B, it is now assumed that in order to answer to the presented examination question, the candidate has begun to write a calculating equation with the electronic pen 2 in a calculating equation entry box according to the answer sheet format displayed on the display device 104. It is also assumed that, when the candidate was about to write the upper horizontal bar of an equal sign (=), the candidate has become aware that the first written number should be "8" instead of "2." Here, the candidate is assumed to be right-handed.

If the back button (left) K4L were used in this situation, the inputted information would be erased in a backward order like the number "3"→"– (minus)"→the number "2." In the case of this example, it is sufficient if only the leading number "2" is erased. As illustrated in FIG. 6C, the candidate therefore traces a position on the display device 104, where the number "2" is displayed, or paints out an area on the display device 104, where the number "2" is displayed, with the electronic pen 2 held by the right hand while depressing the eraser button (left) K5L by the left hand.

While the eraser button (left) K5L is depressed as described above, the control circuit 102 can determine an operation onto the display screen of the display device 104 by the electronic pen 2 to be an erasing operation. The information written at the position traced or the area painted out while the eraser button (left) K5L is depressed is, hence, determined to be a target of erasure. The control circuit 102 then controls the display device 104, and as illustrated in FIG. 6C, erases the information written at the traced position or painted-out area, specifically the number "2" in the case of this example.

If the depression of the eraser button (left) K5L is stopped, the operation onto the display device 104 by the electronic pen 2 can be determined to be an inputting operation. As illustrated in FIG. 6D, the candidate, therefore, writes the number "8" instead as a correct entry with the electronic pen 2 at the position or area where the number "2" has been erased, whereby the correction of the inputted information can be made easily and directly. Moreover, it is unnecessary to take such an action as holding an erasing electronic pen instead, so that the occurrence of such a situation as halting the candidate's thought can be avoided to the utmost.

Here, the candidate has been assumed to be right-handed. In the case of a left-handed candidate, however, similar correction processing can be performed using the eraser button (right) K5R. More specifically, in the case of the left-handed candidate, the eraser button (right) K5R is depressed by the right hand. During the depression, with the electronic pen 2 held by the left hand, a position on the display device 104 where a number as a target of erasure is displayed is traced, or an area on the display device 104 where the number as the target of erasure is displayed is painted out. As a consequence, the erasure of the number as the target of erasure can be conducted. It is, therefore, possible to configure that, depending on a right-handed user or a left-handed user, neither an advantageous situation nor a disadvantageous situation arises in an inputting operation.

As described above, the candidate can input answer information to the digital answer device 1 with the electronic pen 2, and with the eraser button (left) K5L or the eraser button (right) K5R, can also erase only a number as a target of erasure to make a correction.

The digital answer device 1 then generates, as time-series data, the answer information inputted by the candidate. In this case, the answer information as the time-series data is created including not only the input operation but also the erasing operation, so that data is created corresponding to all the operations performed to the digital answer device 1 during the period of from the start of the examination to the end of the examination.

[Specific Example of Answer Information as Time-Series Data]

FIG. 7 illustrates an example of the answer information generated when the inputting operation of the answer and the erasing operation with the eraser button (left) K5L are performed as described with reference to FIGS. 6A to 6D. Further, FIGS. 8A and 8B are illustrations for describing the configuration (minimum unit) of an example of answer information and the configuration of an example of transmittal answer information, each of which is time-series data to be created at the digital answer device 1.

At the digital answer device 1, at the timepoint of every predetermined timing provided by the clock circuit 108, a detection output from the position detection circuitry 105B of the position detection device 105 and operation information on the corresponding one of the operation buttons in the operation unit 106 are acquired, and time-series data is created from such detection outputs and operation information. Sets of such answer information as time-series data serve as a series of answer information to the examination questions.

Figures 8A, 8B:
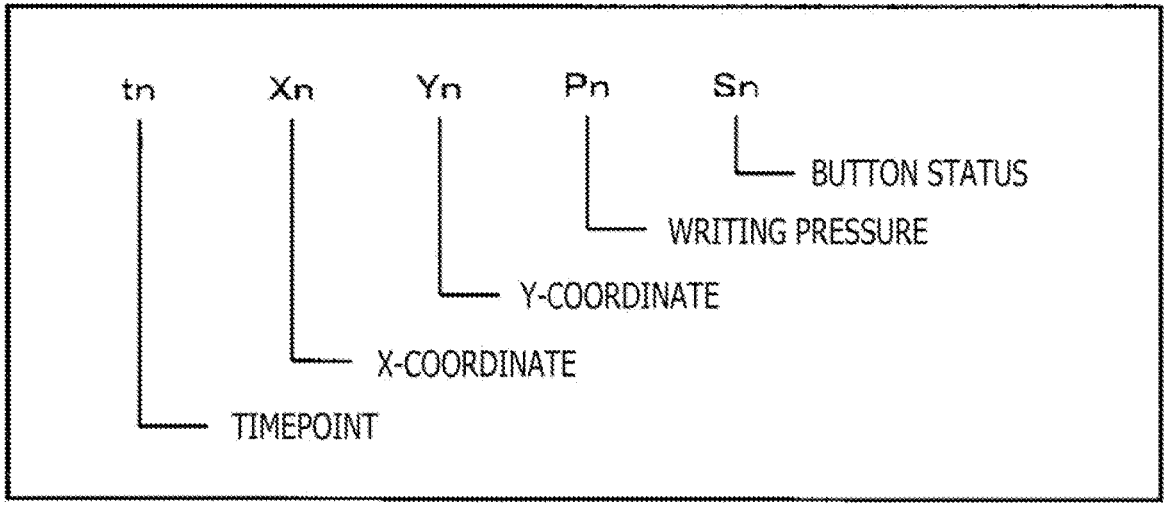
FIGS. 8A and 8B are illustrations for describing the configurations of answer information and transmittal answer information to be created as time-series data at the digital answer device in the first embodiment of the present disclosure.

As illustrated in FIG. 8A, the minimum unit configuration of the answer information includes a timepoint $t_n$, an X-coordinate $X_n$, a Y-coordinate $Y_n$, a writing pressure $P_n$, and a button status $S_n$. The timepoint $t_n$ is information indicating the timepoint of every predetermined timing provided from the clock circuit 108, and is, for example, a timepoint of every interval of 0.5 second in the first embodiment. Obviously, the timepoint $t_n$ can be set as a timepoint of every interval shorter than every 0.5 second, or can be set at a timepoint at relatively long every interval such as every 0.7 second or every one second.

The X-coordinate $X_n$, Y-coordinate $Y_n$ and writing pressure $P_n$ are detection outputs from the position detection circuitry 105B of the position detection device 105 as described with reference to FIG. 5. The button status $S_n$ is information (operation information) that indicates one of the operation buttons as operated from the operation unit 106. Based on the timepoint $t_n$, X-coordinate $X_n$, Y-coordinate $Y_n$, writing pressure $P_n$ and button status $S_n$, the time-series data generation circuitry 107 in the digital correction device 1 creates answer information as time-series data at the timepoint of every 0.5 second from the clock circuit 108.

When no operation is performed by the electronic pen 2 on the display device 104 at the time point tn, the values of the X-coordinate Xn, Y-coordinate Yn and writing pressure Pn each fall at "0 (zero)" accordingly. When none of the operation buttons in the operation unit 106 are operated at the time point tn, the value of the button status Sn becomes "0 (zero)."

It is now assumed that, in the case of the example described with reference to FIGS. 6A to 6D, the number "2" is first written at time points t1 to t5 with the electronic pen 2 on the display screen of the display device 104 as illustrated in a box under "OPERATION INPUT" in FIG. 7. In this case, the time-series data generation circuitry 107 creates, from timepoint information delivered from the clock circuit 108, detection outputs delivered from the position detection circuitry 105B and output values delivered from the operation unit 106, five sets of time-series data for the timepoints t1 to t5 as illustrated in a box under "INPUTTED TIME-SERIES DATA" in FIG. 7.

Because none of the operation buttons in the operation unit 106 are operated at the timepoints t1 to t5, the values of the button statuses S1 to S5 are each "0 (zero)." As the timepoints t1 to t5, X-coordinates X1 to X5, Y-coordinates Y1 to Y5 and writing pressures P1 to P5 other than the button statuses S1 to S5, actual detection values are inputted. As illustrated in a box under "DISPLAY" in FIG. 7, the number "2" is then displayed at an area, which corresponds to the operation, on the display screen of the display device 104.

It is then assumed that at a next timepoint t6, the digital answer device 1 has fallen in a state in which no operation whatsoever is performed, specifically in a state in which the electronic pen 2 is apart from the display screen of the display device 104 and none of the operation buttons in the operation unit 106 are depressed. Even in this situation, time-series data is created. Even when the electronic pen 2 is apart from the display screen of the display device 104, there are two cases, one enabling to detect a position on the position detection sensor 105A as pointed by the electronic pen 2, and the other disabling to detect the pointed position.

The former is a case that the position on the position detection sensor 105A as pointed by the electronic pen 2 can be detected as the tip of the electronic pen 2 is in close proximity to the display screen of the display device 104, for example, a case that the candidate has completed inputting a number and transitions into inputting a next number. In this case, the values of the writing pressure and button status are written as "0 (zero)," and as the values of the timepoint, X-coordinate and Y-coordinate, their detection values are used. At a timepoint t6 in FIG. 7, the input of the number "2" has been completed, and the processing is in the process of a transition into inputting sign "− (minus)." Therefore, as the timepoint t6, timepoint information from the clock circuit 108 is inputted; as the X-coordinate X6 and Y-coordinate Y6, their detection values from the position detection circuitry 105B at the timepoint are inputted, respectively; and the values of a writing pressure P6 and a button status S6 are inputted as "0 (zero)."

The latter is a case that the electronic pen 2 is away by several centimeters or more from the display screen of the display device 104 and therefore the position on the position detection sensor 105A as pointed by the electronic pen 2 cannot be detected, and is a case that the digital answer device 1 is by no means in a state of inputting a number or the like. In this case, the values of the X-coordinate, Y-coordinate, writing pressure and button status other than the timepoint are all inputted as "0 (zero)." If time-series data in which the values of the parameters other than the timepoint are all "0 (zero)" continues as described above, it can be presumed that the digital answer device 1 is not in the state of an inputting operation but its user (candidate) is in the course of thinking.

Further, if an X-coordinate and a Y-coordinate have been detected and the coordinate position represented by them does not change, in other words, if data in which the timepoint changes, the X-coordinate and Y-coordinate do not change and at least the button status is "0 (zero)" continues because the position pointed by the electronic pen 2 does not change, the user of the digital answer device 1 is also presumed to be in the course of thinking. As is appreciated from the foregoing, it is possible, depending on the inputted time-series data, to grasp whether the user of the digital answer device 1 is inputting a number or the like or is in the course of thinking.

Next, it is assumed that sign "− (minus)" is written at time points t7 to t9 with the electronic pen 2 on the display screen of the display device 104 as illustrated in a box under "OPERATION INPUT" in FIG. 7. In this case, the time-series data generation circuitry 107 creates, from timepoint information delivered from the clock circuit 108, detection outputs delivered from the position detection circuitry 105B and output values delivered from the operation unit 106, three sets of time-series data for the timepoints t7 to t9 as illustrated in a box under "INPUTTED TIME-SERIES DATA" in FIG. 7.

Because none of the operation buttons in the operation unit 106 are operated either at the timepoints t7 to t9, the values of the button statuses S7 to S9 are each "0 (zero)." As the timepoints t7 to t9, X-coordinates X7 to X9, Y-coordinates Y7 to Y9 and writing pressures P7 to P9 other than the button status S7 to S9, actual detection values are inputted. As illustrated in a box under "DISPLAY" in FIG. 7, sign "− (minus)" is then displayed at an area, which corresponds to the operation, on the display screen of the display device 104.

At a next timepoint t10, the input of sign "− (minus)" has been completed, and the processing is in the process of a transition into inputting the number "3," and the tip of the electronic pen 2 is in a state of being in close proximity to the display screen of the display device 104. Therefore, as in the case at the timepoint t6, as the time point t10, timepoint information from the clock circuit 108 is inputted; as the X-coordinate X10 and Y-coordinate Y10, their detection values from the position detection circuitry 105B are inputted, respectively; and the values of the writing pressure P10 and button status 510 are inputted as "0 (zero)."

Next, it is assumed that the number "3" is written at time points t11 to t15 with the electronic pen 2 on the display screen of the display device 104 as illustrated in a box under "OPERATION INPUT" in FIG. 7. In this case, the time-series data generation circuitry 107 creates, from timepoint information delivered from the clock circuit 108, detection outputs delivered from the position detection circuitry 105B and output values delivered from the operation unit 106, five sets of time-series data for the timepoints t11 to t15 as illustrated in a box under "INPUTTED TIME-SERIES DATA" in FIG. 7.

Because none of the operation buttons in the operation unit 106 are operated either at the timepoints t11 to t15, the values of the button statuses S11 to S15 are each "0 (zero)." As the timepoints t11 to t15, X-coordinates X11 to X15, Y-coordinates Y11 to Y15 and writing pressures P11 to P15 other than the button statuses S11 to S15, actual detection values are inputted. As illustrated in a box under "DISPLAY" in FIG. 7, the number "3" is then displayed at an area, which corresponds to the operation, on the display screen of the display device 104.

At a next timepoint t16, the input of the number "3" has been completed, and the processing is in the process of a transition into a next operation, and the tip of the electronic pen 2 is in a state of being in close proximity to the display screen of the display device 104. Therefore, as in the case at the timepoint t6, as the time point t16, timepoint information from the clock circuit 108 is inputted; as X-coordinate X16 and Y-coordinate Y16, their detection values from the position detection circuitry 105B are inputted, respectively; and the values of writing pressure P16 and button status S16 are inputted as "0(zero)."

It is now assumed that shortly after inputting the number "3," the candidate had become aware that the first inputted (written) number "2" was wrong and as illustrated in a box under "OPERATION INPUT" in FIG. 7, an erasing operation of the number "2" was performed at timepoints t17 to t21. Specifically, it is assumed that at the timepoints t17 to t21, an operation of tracing the number "2," which was displayed on the display device 104, with the electronic pen 2 was performed while depressing the eraser button (left) K5L. In this case, the time-series data generation circuitry 107 creates, from timepoint information delivered from the clock circuit 108, detection outputs delivered from the position detection circuitry 105B and output values delivered from the operation unit 106, five sets of time-series data for the timepoints t17 to t21 as illustrated in a box under "INPUTTED TIME-SERIES DATA" in FIG. 7.

Because the eraser button (left) K5L in the operation unit 106 has been operated at the timepoints t17 to t21, values which indicate that the eraser button (left) K5L has been operated are inputted as the button statuses S17 to S21. As the timepoints t17 to t21, X-coordinates X17 to X21, Y-coordinates Y17 to Y21 and writing pressures P17 to P21, actual detection values are then inputted. As illustrated in a box under "DISPLAY" in FIG. 7, the digital answer device 1 then comes into a display state that the first inputted number "2" has been erased at an area, which corresponds to the operation, on the display screen of the display device 104.

Because the number "2" as a target of erasure is surrounded by dashed lines in the operation input box with an eraser mark added therein in FIG. 7, a predetermined area in the vicinity of the position indicated by the electronic pen 2 is subjected to erasure in this case while the erasure button (left) K5L is operated. More specifically, the control circuit 102 sets, as a virtual contact surface with the eraser, the area of a circle of a predetermined radius around the position pointed by the electronic pen 2 as illustrated by placing small circles at a starting point (the timepoint t17) and an ending point (the timepoint t21) of the number "2" as the target of erasure. Because the virtual contact surface with the eraser moves with a movement of the electronic pen 2, the control circuit 102 performs display control processing such that a displayed trajectory existing in the area of the virtual contact surface with the eraser, specifically the number "2" in this case is erased.

At a next timepoint t22, the erasure of the number "2" has been completed, and the processing is in the process of a transition into a next operation, and the tip of the electronic pen 2 is in a state of being in close proximity to the display screen of the display device 104. As in the case at the time point t6, as the time point t22, timepoint information from the clock circuit 108 is inputted; as X-coordinate X22 and Y-coordinate Y22, their detection values from the position detection circuitry 105B are inputted, respectively; and the values of writing pressure P22 and button status S22 are inputted as "0 (zero)."

Next, it is assumed that the number "8," which was considered to be correct, was written at time points t23 to t27 with the electronic pen 2 at the area, where the number "2" had been erased, on the display screen of the display device 104 as illustrated in a box under "OPERATION INPUT" in FIG. 7. In this case, the time-series data generation circuitry 107 creates, from timepoint information delivered from the clock circuit 108, detection outputs delivered from the position detection circuitry 105B and output values delivered from the operation unit 106, five sets of time-series data for the timepoints t23 to t27 as illustrated in a box under "INPUTTED TIME-SERIES DATA" in FIG. 7.

Because none of the operation buttons in the operation unit 106 are operated either at the timepoints t23 to t27, the values of the button statuses S23 to S27 are each "0 (zero)." As the timepoints t23 to t27, X-coordinates X23 to X27, Y-coordinates Y23 to Y27 and writing pressures P23 to P27 other than the button statuses S23 to S27, actual detection values are inputted. As illustrated in a box under "DISPLAY" in FIG. 7, the number "8" is then displayed at an area, which corresponds to the operation, on the display screen of the display device 104.

As described with reference to FIG. 7, answer information as time-series data is created corresponding to all operation inputs like the input of the number "2"→the input of sign "−(minus)" the input of the number "3"→the erasure of the number "2"→the input of the number "8." Therefore, not only the inputting operation but also the erasing operation is included in the answer information. As a consequence, it is possible to grasp all of the incorrectly inputted number, the timing at which the user (candidate) had become aware of the incorrect input, the rewritten answer, and so on.

Moreover, time-series data is created even if no operation is performed and the position on the position detection sensor 105A as pointed by the electronic pen 2 is not detected. It is, therefore, possible to grasp, for example, the candidate's thinking time for every examination question. More specifically, a period during which time-series data that the values of the X-coordinate, Y-coordinate, writing pressure and button status other than the timepoint are "0 (zero)" continues is a thinking time. This thinking time can be grasped as one for a question to which an answer is made with the electronic pen 2 immediately after this thinking time.

The answer information created as time-series data as described above is stored and held in the nonvolatile memory in the control circuit 10. When the answer information is put together into transmittal answer information as illustrated in FIG. 8B and the submit button K2 is depressed, the transmittal answer information is sent to the host computer 4.

As illustrated in FIG. 8B, the transmittal answer information is formed of header information including an examination place, a subject, candidate's No., a name and the like, sets of answer information created as time-series data as described with reference to FIG. 7, an answer sheet format, and questions. The answer sheet format and questions are added such that, when a grader marker reproduces the answer information and makes marking, the grader marker can display the answer sheet format and examination questions in the mode illustrated in FIG. 6A, and can then reproduce the status of answering according to the answer information for marking.

If identification information has been added to the answer sheet format and examination questions, the answer sheet format and examination questions themselves may not be included in transmittal answer information unlike the transmittal answer information illustrated in FIG. 8B. The identification information added to the answer sheet format and examination questions may be added to the transmittal answer information. As an alternative, the answer sheet format and examination questions can be separately managed by adding different pieces of identification information to them, or the examination questions and answer sheet format can be managed together under a single piece of identification information by taking the examination questions as parts of the answer sheet format.

The digital answer device 1 includes the back button (left) K4L and back button (right) K4R as mentioned above. It is, therefore, possible to erase immediately preceding inputted information and to have the inputted answer returned to the last state. In this case, answer information is also created as time-series data as in the case described with reference to FIG. 7.

FIG. 9 depicts another example of answer information to be generated if the inputting operation of an answer and an erasing operation, which uses the back button (left) K4L, are performed. In the case of this example, it is assumed that, as illustrated in FIG. 9, the number "8" was inputted at timepoints t1 to t5, the sign "– (minus)" was inputted at timepoints t7 to t9, and the number "2" was inputted at timepoints t11 to t15. In this case, "8–2" is displayed on the display device 104 as also illustrated in FIG. 9. At each of timepoints t6, t10, and t16, on the other hand, the input of the number or the sign has been completed, and the processing is in the process of a transition into a next operation. Time-series data created at the timepoints t1 to t16 is, therefore, created similar to the time-series data created at the timepoints t1 to t16 as described with reference to FIG. 7, although there is a difference in the order of inputting of the numbers.

It is now assumed that, immediately after inputting the number "2" at the timepoints t11 to t15, the candidate had become aware that the number "2" was a wrong input and as illustrated in a box under "OPERATION INPUT" in FIG. 9, the back button (left) K4L was depressed at a timepoint t17. In this case, the time-series data generation circuitry 107 creates, from timepoint information delivered from the clock circuit 108, detection outputs delivered from the position detection circuitry 105B and output values delivered from the operation unit 106, a single set of time-series data for the timepoint t17 as illustrated in a box under "INPUTTED TIME-SERIES DATA" in FIG. 9.

Because the back button (left) K4L in the operation unit 106 has been operated at the timepoint t17, a value which indicates that the back button (left) K4L has been operated is inputted as a button status S17. As the timepoint t17, X-coordinate X17, Y-coordinate Y17 and writing pressure P17, actual detection values are then inputted. As there is no detection output from the position detection circuitry 105B in this case, value "0 (zero)" is inputted as the X-coordinate X17, Y-coordinate Y17 and writing pressure P17.

The control circuit 102 then cancels the operation performed at the timepoints t11 to t15, which is the operation performed immediately before the back button K4L was operated. As a consequence, as illustrated in a box under "DISPLAY" in FIG. 9, a state, in which the number "2" inputted immediately before the back button (left) K4L was operated has been erased, is displayed on the display screen of the display device 104. The input operation immediately before the back button (left) K4L was operated can be specified as an operation performed between the timepoint t10 and the timepoint t16 which are timepoints where no input operation was performed.

At a next timepoint t18, the digital answer device 1 is assumed to be in a state that the depression of the back button (left) K4L has been completed, the processing is in the process of a transition into a next operation, the electronic pen 2 is apart from the display screen of the display device 104, and none of the operation buttons in the operation unit 106 are depressed. However, the tip of the electronic pen 2 is in close proximity to the display screen of the display device 104, and therefore the digital answer device 1 is in a state that the detection of a position on the position detection sensor 105A as pointed by the electronic pen 2 is possible. Therefore, as the time point t18, timepoint information from the clock circuit 108 is inputted; as X-coordinate X18 and Y-coordinate Y18, their detection values from the position detection circuitry 105B are inputted, respectively; and the values of writing pressure P18 and button status S18 are inputted as "0 (zero)."

Next, it is assumed that the number "3," which was considered to be correct, was written at time points t19 to t23 with the electronic pen 2 at the area, where the number "2" had been erased, on the display screen of the display device 104 as illustrated in a box under "OPERATION INPUT" in FIG. 9. In this case, the time-series data generation circuitry 107 creates, from timepoint information delivered from the clock circuit 108, detection outputs delivered from the position detection circuitry 105B and output values delivered from the operation unit 106, five sets of time-series data for the timepoints t19 to t23 as illustrated in a box under "INPUTTED TIME-SERIES DATA" in FIG. 9.

Because none of the operation buttons in the operation unit 106 are operated either at the timepoints t19 to t23, the values of the button statuses S19 to S23 are each "0 (zero)." As the timepoints t19 to t23, X-coordinates X19 to X23, Y-coordinates Y19 to Y23 and writing pressures P19 to P23 other than the button statuses S19 to S23, actual detection values are inputted. As illustrated in a box under "DISPLAY" in FIG. 9, the number "3" is then displayed at an area, which corresponds to the operation, on the display screen of the display device 104.

As described with reference to FIG. 9, answer information as time-series data is created corresponding to all operation inputs like the input of the number "8"→the input of sign "– (minus)"→the input of the number "2"→an input by the back button (the erasure of the number "2" inputted immediately before)→the input of the number "3." Therefore, not only the inputting operation but also the erasing operation is included in the answer information. The answer information created as described above is also put together into such transmittal answer information as illustrated in FIG. 8B, and is sent to the host computer 4.

As a consequence, even when the back button (left) K4L has been operated, it is possible to grasp all of the incorrectly inputted number, the timing at which the user (candidate) had become aware of the incorrect input, the rewritten answer, and so on. Obviously, even if the back button (right) K4R has been depressed, it is similarly possible to make the creation of answer information as time-series data and the display or erasure of inputted information according to operations.

The host computer 4 then sends the transmittal answer information, which has been received from each digital answer device 1, to the cloud system 5. In the cloud system 5, marking and grading are made to determine successful candidates, and a listing of such successful candidates can be provided to the organizer of the examination. As mentioned above, the organizer (specifically, grader markers) of the examination then checks the answer information as needed, and can appropriately specify finally successful candidates.

As described above, the digital answer device 1 of the first embodiment can receive an input of answers, which have been made using the electronic pen 2, from a candidate, and can create and hold answer information as time-series data according to the answers. Then, the digital answer device 1 of the first embodiment can create transmittal answer information, and can submit the answer information to the cloud system 5 via the host computer 4.

Further, the use of the eraser button (left) K5L or eraser button (right) K5R allows to erase an answer portion as a wrong input without replacing the electronic pen 2 with an erasing electronic pen, and can promptly and appropriately input a correct answer to promptly finalize the first inputted answer into an answer that is considered to be correct as a whole. In addition, the answer information is time-series data, so that, if a need arises, the grader marker can reproduce the status at the time of the answering and can appropriately make regrading or the like of the answer.

It is possible to program the digital answer device 1 such that, when the submit button K2 is depressed, for example, the transmittal answer information illustrated in FIG. 8B and created in the nonvolatile memory in the control circuit 102 is stored in the external memory connected to the memory device 103 and the candidate can take the external memory back home. As a consequence, the candidate can reproduce the transmittal answer information, which is stored in the external memory, at home by using his or her own personal computer or the like, and can make self-marking.

If it is programmed to store the transmittal answer information in the external memory connected to the memory device 103, rewriting is disabled to prevent any alteration of the transmittal answer information. It is possible to take a measure, for example, such that in order to convert the external memory to a read-only memory, the external memory is rendered no longer usable if information such as a header part is rewritten. Besides this, various methods can be used as methods for disabling rewriting.

If an appropriate measure is taken to prevent any alteration of the transmittal answer information stored in the external memory connected to or removed from the memory device 103 as described above, the candidate can keep it with him or her and, if any doubt arises as to the marking, can use it as an evidence upon making an objection.

Under control of the control circuit 102, it is also possible to disable operation of the eraser button (right) K5R while the eraser button (left) K5L is operated and to disable operation of the eraser button (left) K5L while the eraser button (right) K5R is used.

Advantageous Effects of First Embodiment

With the digital answer device 1 of the first embodiment, the use of the eraser button (left) K5L or eraser button (right) K5R enables to conduct the erasure of a desired portion with the electronic pen 2, which is used in writing, without additionally providing an erase-dedicated electronic pen. An action to replace the electronic pen 2 with an erase-dedicated electronic pen is, therefore, not needed, so that an erasing action is prevented from interfering with a line of thought.

Further, the answer information can be created as time-series data. By doing so, the answers can also be marked by a computer and, if a need arises, the status of answering can be reproduced (reconstructed) for easy regrading of the answers.

Second Embodiment (Distance Learning System)

Figure 10:
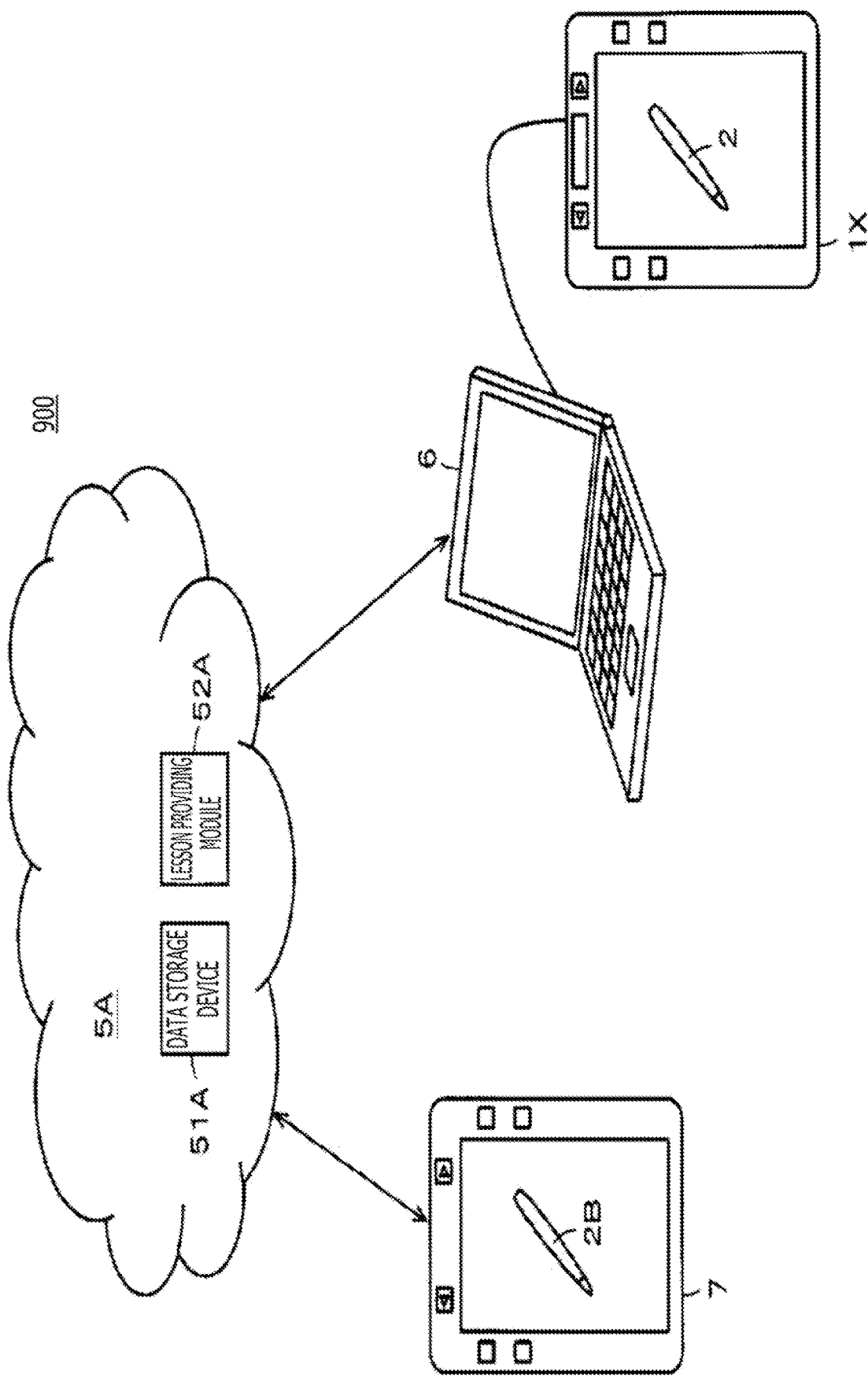
FIG. 10 is an illustration for describing an outline of a distance learning system according to a second embodiment of the present disclosure.

FIG. 10 is an illustration for describing an outline of a distance learning system 900 according to a second embodiment. As illustrated in FIG. 10, the distance learning system 900 is constructed of a personal computer 6 and a digital answer device 1X, both of which a student uses, for example, at home or the like, and a digital correction device 7, which a corrector (tutor) uses, connected together via a cloud system 5A. Through such a distance learning system, distance learning for various objectives can be conducted including, for example, subject learning courses or admission examination preparation courses for elementary school students, junior high school students or high school students, and certification examination preparation courses or qualifying examination preparation courses for university/college students and adults.

As illustrated in FIG. 10, the cloud system 5A is provided with a data storage device 51A and a lesson providing module 52A. The data storage device 51A has a format etc. storage area, an answer information storage area, and a lesson information storage area. In the format etc. storage area, an answer sheet format and examination questions to be provided to the students are stored. In the answer information storage area, answer information from the student is stored. In the lesson information storage area, material information such as videos and still images, which make up lessons in the courses, are stored.

The lesson providing module 52A provides lessons in students' intended courses by providing, in response to requests from the students, material information such as videos and still images, which make up the lessons, from the lesson information storage area of the data storage device 51A. In addition, the lesson providing module 52A also provides the students with the examination questions and answer sheet format which are both stored in the data storage device 51A, and further has a function to conduct examinations for checking the depth of understanding of lessons.

At home or the like, for example, each student requests for the provision of a lesson to the lesson providing module 52A of the cloud system 5A through his or her own personal computer 6, and by the personal computer 6, reproduces videos and still images for the intended course to take the lesson. The student also requests for an examination to the lesson providing module 52A of the cloud system 5A through his or her own personal computer 6, receives the provision of an answer sheet format and examination questions for the examination, and takes the examination. In this case, the examination questions are provided to the student by displaying them on the personal computer 6, and the answer sheet format is provided from the personal computer 6 to the digital answer device 1X.

The digital answer device 1X has a configuration similar to that of the digital answer device 1 in the first embodiment as described with reference to FIGS. 2 to 5. Therefore, the digital answer device 1X will also be described as having the configurations illustrated, illustrated in FIGS. 2 to 5. However, the digital answer device 1X in the second embodiment includes a digital interface of, for example, a USB specification or the like, and is connectable to the personal computer 6 by wire. In this respect only, the digital answer device 1X in the second embodiment is different from the digital answer device 1 in the first embodiment. When connected to the personal computer 6 via the digital interface, the digital answer device 1X functions as an input device for the personal computer 6.

Upon reception of the provision of the answer sheet format from the personal computer 6, the digital answer device 1X displays it on the display device 104, and makes it ready to receive an input of answers to the answer sheet format through the position detection device 105. Similar to the case of the first embodiment, the student inputs answers to the digital answer device 1X by using the electronic pen 2. As described with reference to FIGS. 6A to 9, the digital answer device 1X receives the input of the answers by the electronic pen 2, generates answer information as time-series data, put it together into transmittal answer information, and sends it to the cloud system 5A through the personal computer 6. As a consequence, the transmittal answer information generated at the student's digital answer device 1X is stored in the answer information storage area of the data storage device 51A of the cloud system 5A.

On the other hand, the corrector (tutor) accesses to the cloud system 5A through the digital correction device 7, downloads the transmittal answer information of the student, of whom he or she takes charge, from the answer information storage area of the data storage device 51A, and stores it in a memory device 703 (see FIG. 13) of the digital correction device 7. The corrector (tutor) then reproduces the transmittal answer information, marks and grades the answers of the student with the electronic pen 2B while checking the depth of the student's understanding, and inputs "true (T)," "false (F)," explanatory notes, commentary notes and/or the like. This inputted information is stored and held as correction information. The correction information so generated is added to the transmittal answer information and is uploaded from the digital correction device 7 to the cloud system 5A, and the student can read the details of corrections by using his or her own personal computer 6 and digital answer device 1X.

In the second embodiment, the answer information is also generated as time-series data in the digital answer device 1X of the student. At the digital answer device 7, the status of answering can be grasped by using the answer information, which has been generated as time-series data at the digital answer device 1, as it is, and therefore, the depth of the student's understanding can be grasped more precisely.

Specifically, it is possible not only to find out the questions answered wrong but also to precisely find out how the wrong answers have been derived, how changes have been made to result in the wrong answers, and conversely how the correct answers have been reached. In addition, it is also possible to find out the order of answering, the time required for answering, and so on, and also to easily find out which questions the student has struggled to answer with time, and which questions the student has been able to answer without spending much time.

[Details of Digital Correction Device 7]

Figure 11:
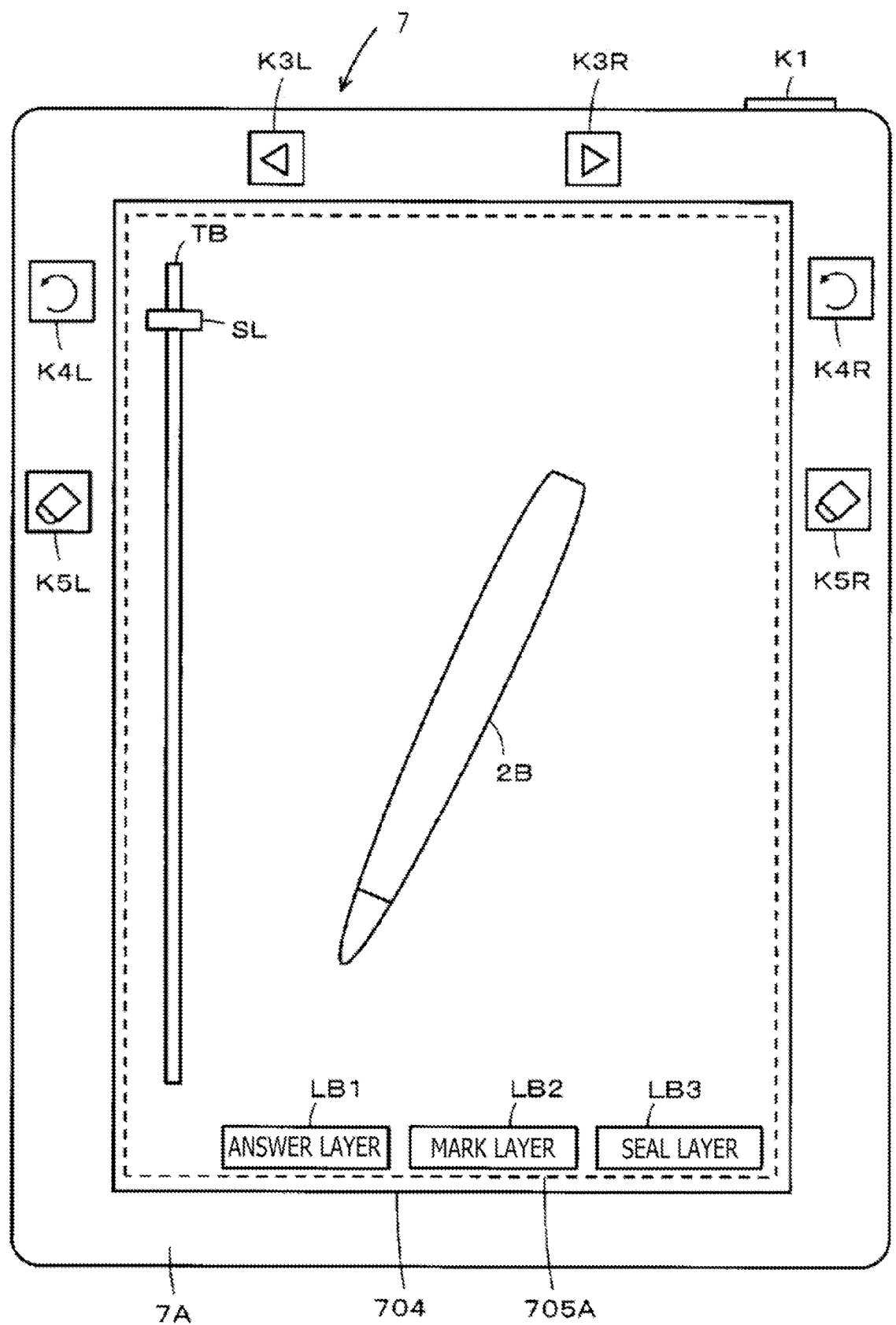
FIG. 11 is an external view for describing an external appearance of a digital correction device in the distance learning system according to the second embodiment of the present disclosure.

FIG. 11 is an external view for describing an external appearance of the digital correction device 7 in the distance learning system 900 according to the second embodiment. As illustrated in FIG. 11, the digital correction device 7 has the shape of a so-called tablet personal computer (PC). This digital correction device 7 is also provided with operation buttons similar to those in the digital answer device 1 in the first embodiment. In the digital correction device 7 illustrated in FIG. 11, the operation buttons, which realize similar functions as the operation buttons arranged in the digital answer device 1 in the first embodiment, are, therefore, identified by similar reference signs, and their detailed description is omitted herein.

More specifically, the power button K1 is disposed in a right upper side wall portion of the digital correction device 7 as illustrated in FIG. 11. Further, the digital correction device 7 includes a display device 704 having a display screen of the A4 size. Under the display device 704, a position detection sensor 705A is disposed facing the entire surface of the display screen of the display device 704. As a consequence, various pieces of information such as characters, symbols and figures can be inputted by handwriting by bringing an electronic pen 2B in contact with the display screen of the display device 704 to operate. The electronic pen 2B has a similar configuration as the electronic pen 2.

Surrounding the display screen of the display device 704, a bezel portion formed by a front panel 7A is disposed. On an upper-side portion of the bezel portion, the rightward page change button K3R and leftward page change button K3L are disposed. In addition, on the right-side portion of the bezel portion, the back button (right) K4R and the eraser button (right) K5R are disposed. On a left-side portion of the bezel portion, the back button (left) K4L and the eraser button (left) K5L are disposed.

Similar to the digital answer device 1 described with reference to FIG. 3, the digital correction device 7 is configured of a casing, a circuit board, the position detection sensor 705A, the display device 704 and the front panel 7A, which are stacked in this order from the bottom. Further, as mentioned above, it is configured to enable input operations to the digital correction device 7 by the electronic pen 2B as in the case of the digital answer device 1 in the first embodiment.

As illustrated in FIG. 11, a time bar TB, a slider SL, an answer layer button LB1, a mark layer button LB2 and a seal layer button LB3 are displayed on the display device 704 of the digital correction device 7. They are so-called software operating devices which are operably displayed by software.

Specifically, the time bar TB and the slider SL are operated when answer information as time-series data is reproduced along a time series. Specifically, an upper end portion of the time bar TB is set as an examination start timepoint, and a lower end portion of the time bar TB is set as an examination end timepoint. By slidingly moving the position of the slider SL on the time bar TB, the answering status corresponding to the answer information as time-series data can be sequentially reproduced (displayed) on the display device 704 according to the sliding movement of the slider SL.

Further, it is possible to display, on the display device 704, the answers that correspond to the answer information from the examination start timepoint at the upper end portion of the time bar TB to a timepoint where the slider SL is placed. If the slider SL is placed at the lower end portion of the time bar TB, the answers to the relevant page in the answer sheet format can be all displayed accordingly. Moreover, the answers corresponding to the answer information as the time-series data can each be displayed little by little on the display device 704 according to the sliding movement of the slider SL on the time bar TB, so that the corrector (tutor) can make correction while reviewing the status of the student's answering in detail.

With the digital correction device 7, data to be processed is arranged in a layered structure, so that the piece of data as a processing target can be changed depending on the layer.

For this purpose, the answer layer button LB1, mark layer button LB2, and seal layer button LB3 are arranged.

FIG. 12 is an illustration for making a description on the layered structure of the data to be processed in the distance learning system according to the second embodiment. In the second embodiment, the data to be processed is arranged in a four-level hierarchy of an answer sheet format layer LY1, an answer layer LY2, a mark layer LY3, and a seal layer LY4 as depicted in FIG. 12. The answer sheet format layer LY1 is a layer for primarily displaying a format corresponding to the answer sheet format, and the answer layer LY2 is a layer for displaying an answer according to the answer information. The mark layer LY3 is a layer for making marking and inputting correction information with respect to the answer, and the seal layer LY4 is a layer for inputting seal information.

When the answer layer button LB1 illustrated in FIG. 11 is depressed, the answer sheet format expanded on the answer sheet format layer LY1 and the answer according to the answer information expanded on the answer layer LY2 are displayed on the display device 704. According to operations of the rightward page change button K3R and leftward page change button K3L, the pages can be changed to enable the review of the individual pages in the answer sheet format.

When the mark layer button LB2 is depressed, the answer sheet format expanded on the answer sheet format layer LY1 and the answers corresponding to the answer information expanded on the answer layer LY2 are displayed on the display device 704. In this case, the slider SL on the time bar TB is operated to enable the reproduction (display) of the answers corresponding to the answer information according to the sliding movement. Further, the correction information such as "true (T)," "false (F)," explanatory notes, commentary notes and/or the like can be inputted to the mark layer LY3.

When the seal layer button LB3 is depressed, the answer sheet format expanded on the answer sheet format layer LY1, the answers corresponding to the answer information expanded on the answer layer LY2, and the details of the corrections corresponding to the correction information expanded on the mark layer LY3 are displayed on the display device 704. Further, the seal information can be inputted to the seal layer LY4.

Figure 13:
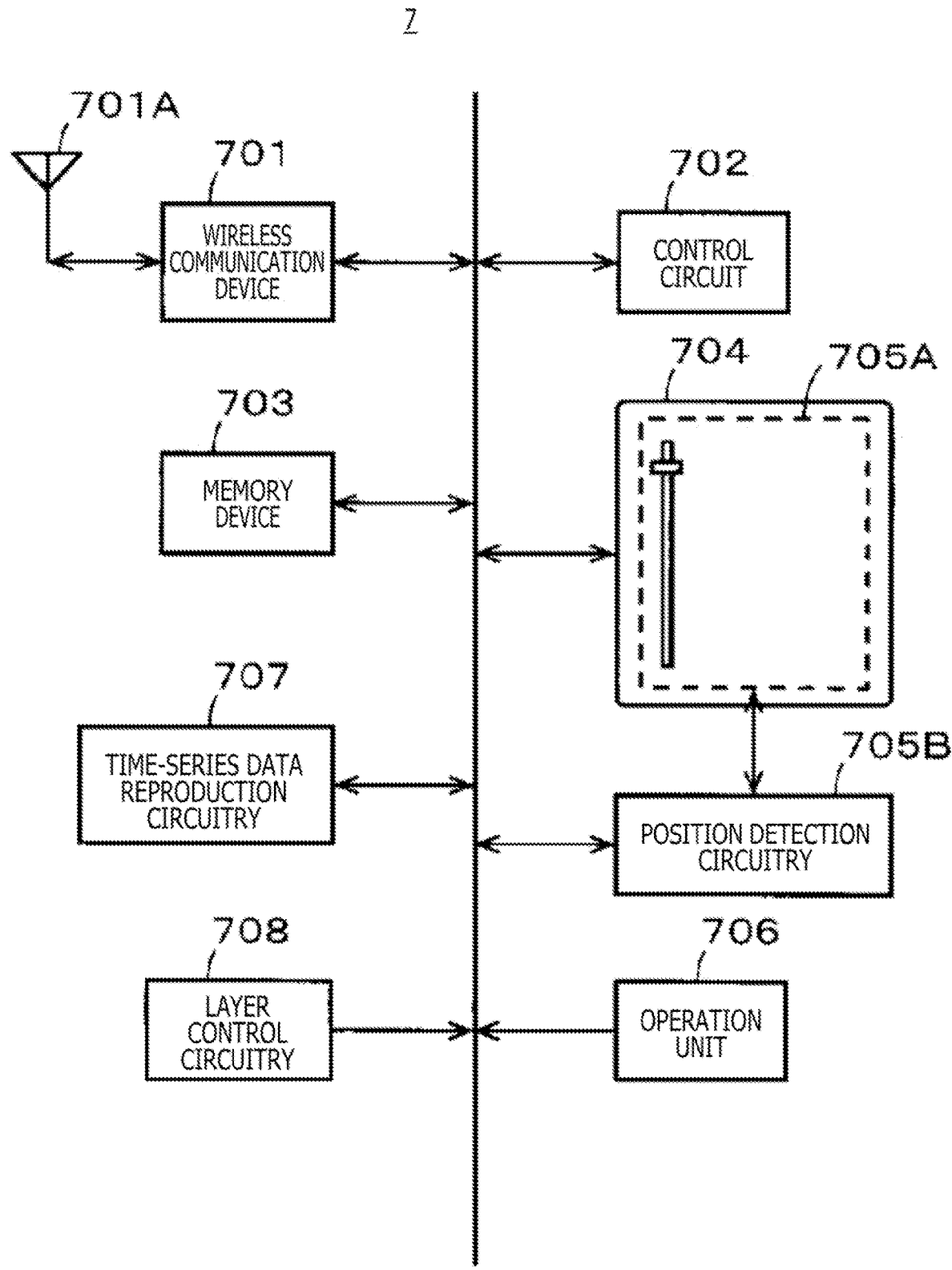
FIG. 13 is a block diagram for describing a configuration example of the digital correction device in the distance learning system according to the second embodiment of the present disclosure.

FIG. 13 is a block diagram for describing a configuration example of the digital correction device 7. A sending and receiving antenna 701A and a wireless communication device 701 are elements that realize wireless communication functions. The functions of the sending and receiving antenna 701A and wireless communication device 701 enable the digital correction device 7 to access to the cloud system 5A, for example, through a wireless LAN of the Wi-Fi (registered trade mark) specification and the Internet or through a mobile phone network and the Internet.

Although not illustrated in the figure, a control circuit 702 is a computer device including a CPU, a ROM, a RAM, a nonvolatile video memory such as, for example, a flash memory, and the like, all of which are connected together via a bus. The control circuit 702 realizes functions that control individual elements of the digital correction device 7. A memory device 703 includes one or both of an internal memory and an external memory like the memory device 103 in the above-mentioned digital answer device 1. The memory device 703 is programmed to enable the writing, erasure and reading of the answer sheet format, answer information, correction information, seal information and the like in or from the internal memory and external memory of the memory device 703 under control of the control circuit 702.

The display device 704 is an element including, for example, a thin display device such as an LCD or organic EL display and a display-processing circuitry. On the display device 704, various pieces of information such as the answer sheet format, answer information, correction information and seal information can be displayed under control of the control circuit 702.

The position detection sensor 705A and a position detection circuitry 705B make up a position detection device 705. The position detection device 705 is of an electromagnetic induction exchange type (the EMR (registered trademark) type). Therefore, the position detection device 705 in the digital correction device 7 is also configured like the position detection device 105 in the digital answer device 1 as described with reference to FIG. 5.

An operation unit 706, as already mentioned above, includes the power button K1, rightward page change button K3R, leftward page change button K3L, back button (right) K4R, back button (left) K4L, eraser button (right) K5R and eraser button (left) K5L. If these operation buttons are operated, signals that correspond to the operated buttons can be supplied to the control circuit 702.

Time-series data reproduction circuitry 707 performs processing to reproduce (display), for example, the answers, which correspond to the student's answer information stored in the external memory connected to the memory device 703, on the display device 704 according to the sliding movement of the slider SL on the time bar TB as described with reference to FIG. 11. In other words, the time-series data reproduction circuitry 707 performs processing to display, on the display device 704, the answer or answers corresponding to the answer information from the examination start timepoint to the timepoint where the slider SL is placed on the time bar TB. The time-serier data reproduction circuitry 707 may be realized by the control circuit 702.

According to the status of operations of the answer layer button LB1, mark layer button LB2 and seal layer button LB3, layer control circuitry 708 specifies a layer to be used, and performs processing to control information to be displayed and information the input of which is to be accepted. When making a correction, the corrector (tutor) hence downloads the transmittal answer information of a target student from the cloud system 5A, and stores it in the external memory connected to the memory device 703. The layer control circuitry 708 may be realized by the control circuit 702.

When the answer layer button LB1 is depressed, the layer control circuitry 708 performs processing to expand the answer sheet format, which is stored in the external memory connected to the memory device 703, on the answer sheet format layer LY1, to expand the answer information on the answer layer LY2, and to display them simultaneously on the display device 704. When the mark layer button LB2 is depressed, the layer control circuitry 708 displays the answer sheet format, which has been expanded on the answer sheet format layer LY1, and the answer, which corresponds to the answer information expanded on the answer layer LY2, on the display device 704. According to a sliding movement of the slider SL on the time bar TB, the time-series data reproduction circuitry 707 makes the reproduction of the answer information, and the layer control circuitry 708 enables the input of the correction information to the mark layer LY3.

When the seal layer button LB3 is depressed, the layer control circuit 708 displays the answer sheet format expanded on the answer sheet format layer LY1, the answer or answers corresponding to the answer information expanded on the answer layer LY2 and details of the correction corresponding to the correction information expanded on the mark layer LY3 on the display device 704. Further, the layer control circuitry 708 enables the input of the seal information to the seal layer LY4.

As described above, the layer control circuitry 708 displays the answer sheet format and the answer or answers on the display device 704. In addition, the layer control circuitry 708 also enables the input of the correction information to the mark layer LY3 when the mark layer button LB2 is depressed, and the input of the seal information to the seal layer LY4 when the seal layer button LB3 is depressed.

[Input of Correction Information to Digital Correction Device 7]

Figure 14A:
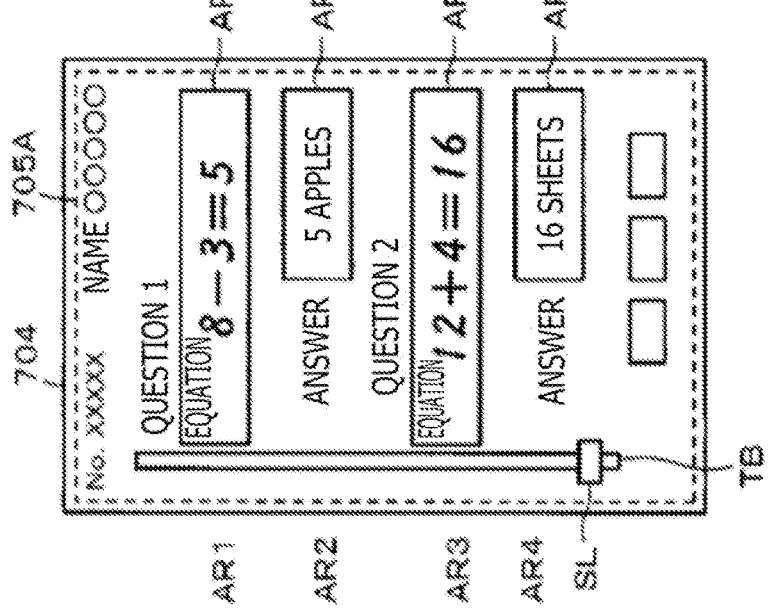
FIGS. 14A to 14C are illustrations for making a description on an example of display information upon reproduction of answer information at the digital correction device in the second embodiment of the present disclosure.
Figure 14B:
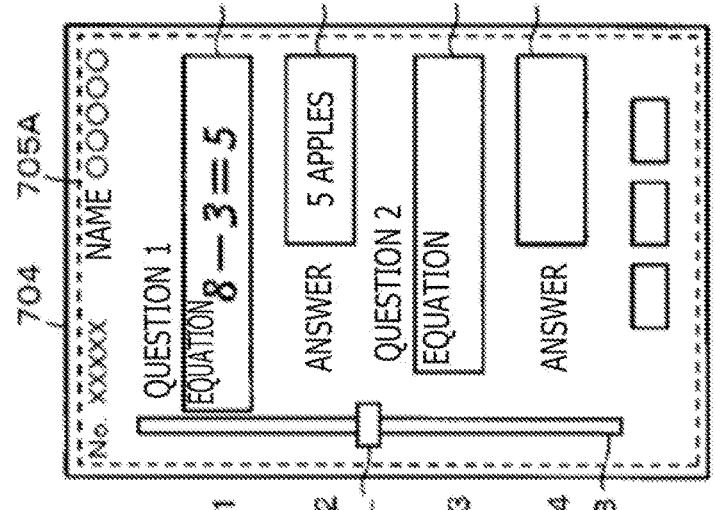
Figure 14C:
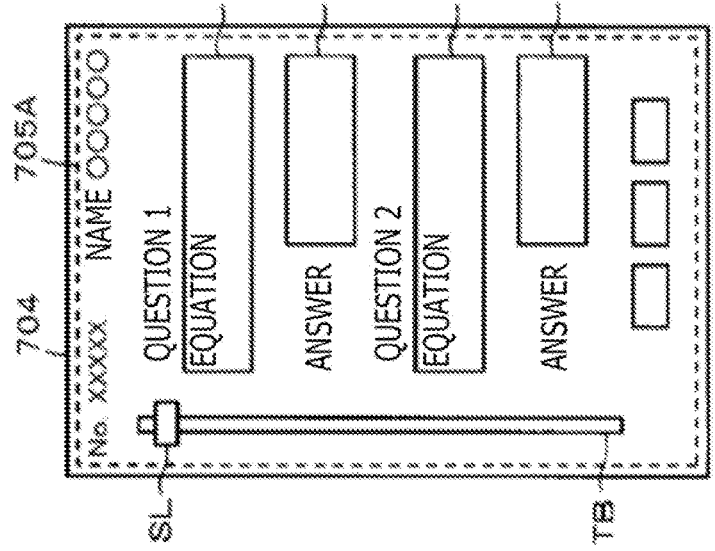

Next, a description will be made about the reproduction of answers and the manner of input of correction information by use of the digital correction device 7 having the above-mentioned configuration. FIGS. 14A to 14C are illustrations for making a description on an example of display information upon reproduction of answer information at the digital correction device 7.

The corrector (tutor) inputs the "Student No." of a student as a target of correction to the prescribed position on the display device 704 of the digital correction device 7, creates a request for the provision of the transmittal answer information including this "Student No.," and sends the request to the cloud system 5A. Responsive to the request, the student's transmittal answer information specified by the designated "Student No." is sent back from the cloud system 5A. The digital correction device 7 receives the student's transmittal answer information through the sending and receiving antenna 701A and wireless communication device 701. The control circuit 702 then stores the received transmittal answer information in the external memory connected to the memory device 703, and holds it ready for use.

When the corrector (tutor) subsequently depress, with the electronic pen 2B, the mark layer button LB2 displayed on the display device 704, the answer sheet format is expanded on the answer sheet format layer LY1 and is displayed on the display device 704 as illustrated in FIG. 14A. In the case of the example of FIGS. 14A to 14C, the answer sheet format includes an entry box AR1 for an equation for Question 1, an entry box AR2 for an answer to Question 1, an entry box AR3 for an equation for Question 2, and an entry box AR4 for an answer to Question 2.

It is also programmed such that the answers corresponding to the answer information can be expanded on the answer layer LY2 and can then be displayed. The expansion of the answers corresponding to the answer information can be conducted according to a sliding movement of the slider SL on the time bar TB, and the answers can then be displayed on the display device 704. The sliding movement of the slider SL can be caused by bringing the electronic pen 2B into contact with the displayed position of the slider SL and moving the electronic pen 2B while keeping it in contact with the displayed position.

It is also possible to further arrange a capacitive touch sensor facing the display screen of the display device 704 in the digital correction device 7, and to arrange a detection circuitry that can detect a pointed position based on an output signal from the touch sensor. Specifically, the position detection sensor 705A of the electromagnetic induction exchange type and the capacitive touch sensor can also be mounted to realize a hybrid position detecting function. If the capacitive touch sensor is mounted as described above, the corrector (tutor), with his or her own finger, can operate the slider SL, and can also operate the answer layer button LB1, mark layer button LB2 and seal layer button LB3.

It is now assumed that the slider SL placed at the upper end portion of the time bar TB has been slidingly moved little by little to an intermediate position of the time bar TB. In this case, owing to the function of the time-series data reproduction circuitry 707, the answers corresponding to the answer information from the examination start timepoint to the timepoint at which the slider SL has been placed are expanded on the answer layer LY2 according to a sliding movement of the slider SL, and the answers are sequentially displayed on the display device 704, as illustrated in FIG. 14B. Therefore, the status of answering (entry) of the equation for Question 1 into the entry box AR1 and the answer to Question 1 into the entry box AR2 are reproduced.

In this case, the answers corresponding to the answer information are expanded on the answer layer LY2 and are sequentially displayed, according to the sliding movement of the slider SL. If the student has corrected at least one of the answers, the status of the correction is also reproduced. If the input of the answers is performed, for example, as described with reference to FIGS. 6A to 7, it is also possible to find out, for example, the status that the leading number "2" is erased and the number "8" is written instead.

It is next assumed that the slider SL placed at the intermediate position of the time bar TB has been slidingly moved little by little to the lower end portion of the time bar TB. In this case, owing to the function of the time-series data reproduction circuitry 707, the answer according to the answer information from the timepoint corresponding to the intermediate position of the time bar TB, at which the slider SL was placed, to the timepoint corresponding to the lower end portion of the time bar TB, where the slider SL has been placed, is expanded on the answer layer LY2 according to the sliding movement of the slider SL, and the answer is sequentially displayed on the display device 704, as illustrated in FIG. 14C. Therefore, the status of answering (entry) of the equation for Question 2 into the entry box AR3 and the answer to Question 2 into the entry box AR4 is reproduced.

By reproducing (displaying) the answering status, which corresponds to the answer information, on the display device 704 along with the sliding movement of the slider SL on the time bar TB, the corrector (tutor) can find out the answering status in detail. In the status illustrated in FIGS. 14A to 14C, the correction information can be inputted to the mark layer LY3 through the position detection device 705 by performing an operation with the electronic pen 2B on the display screen of the display device 704. The inputted correction information is recorded in the external memory connected to the memory device 703 under control of the control circuit 702.

Therefore, to the mark layer LY3, "T" and "F" can be added as depicted in FIG. 12, and explanatory notes and/or commentary notes can also be inputted. In this case, by setting to enable specifying a pen color, it is possible, for example, to input "T," "F," explanatory notes and commentary notes, for example, in red, or to input "T" and "F" in red and to input explanatory notes and commentary notes in blue. As described above, corrections can be inputted in a mode different from that of answers.

In the case of the example illustrated in FIGS. 14A to 14C, the answers are made in the order of Question 1→Question 2. The answers may, however, be made in the order of Question 2→Question 1. In such a case, the answers are reproduced according to the answer information as the time-series data such that the answer to Question 2 is displayed first and the answer to Question 1 is displayed next.

If the seal layer button LB3 is then depressed, the input of seal information to the seal layer LY4 becomes possible. As the seal information, a seal impression image which has been provided beforehand and includes the name of the corrector (tutor) and the month/date/year of the correction can be added to a predetermined position on the answer sheet format. To the seal layer, character information such as a review, summary comments and a learning policy from now on can be inputted and added by the corrector (tutor).

FIG. 15 depicts a table for describing an example of transmittal correction information to be generated at the digital correction device 7. As illustrated in FIG. 15, the transmittal correction information includes header information such as "STUDENT NO.," "STUDENT NAME" and "SUBJECT," answer information (information on the answer layer), an answer sheet format (information on the answer sheet format layer), correction information (information on the mark layer), and seal information (information on the seal layer).

The header information, answer information and answer sheet format are those which correspond to the transmittal answer information created at the student's digital answer device 1X. These pieces of information are not altered at the digital correction device 7. Further, the correction information and seal information are those which have been inputted by the corrector (tutor) to the digital correction device 7. Although not illustrated in FIG. 11, by depressing a correction end button displayed at a predetermined position on the display device 704 in the digital correction device 7 after the correction work, the transmittal correction information illustrated in FIG. 15 is created in the external memory connected to the memory device 703. This transmittal correction information is uploaded to the cloud system 5A and stored, for example, in the data storage device 51A, so that the student can download the transmittal correction information by using his or her own personal computer 6 and can then check the correction information.

In the distance learning system of the second embodiment, the correction information to be inputted and generated at the digital correction device 7 is not needed to be time-series data unlike the answer information. Therefore, the correction information can be converted to various kinds of corresponding data such that the correction information is changed to image information on every page of the answer sheet format or "T" and "F" are changed to image information while texts such as explanatory notes or commentary notes are changed to character information.

The correction information can also be created as time-series data as in the case of the answer information by providing the digital correction device 7 with time-series data generation circuitry and a clock circuit similar to those in the digital answer device 1.

[Summary of Processing at Digital Correction Device 7]

Figure 16:
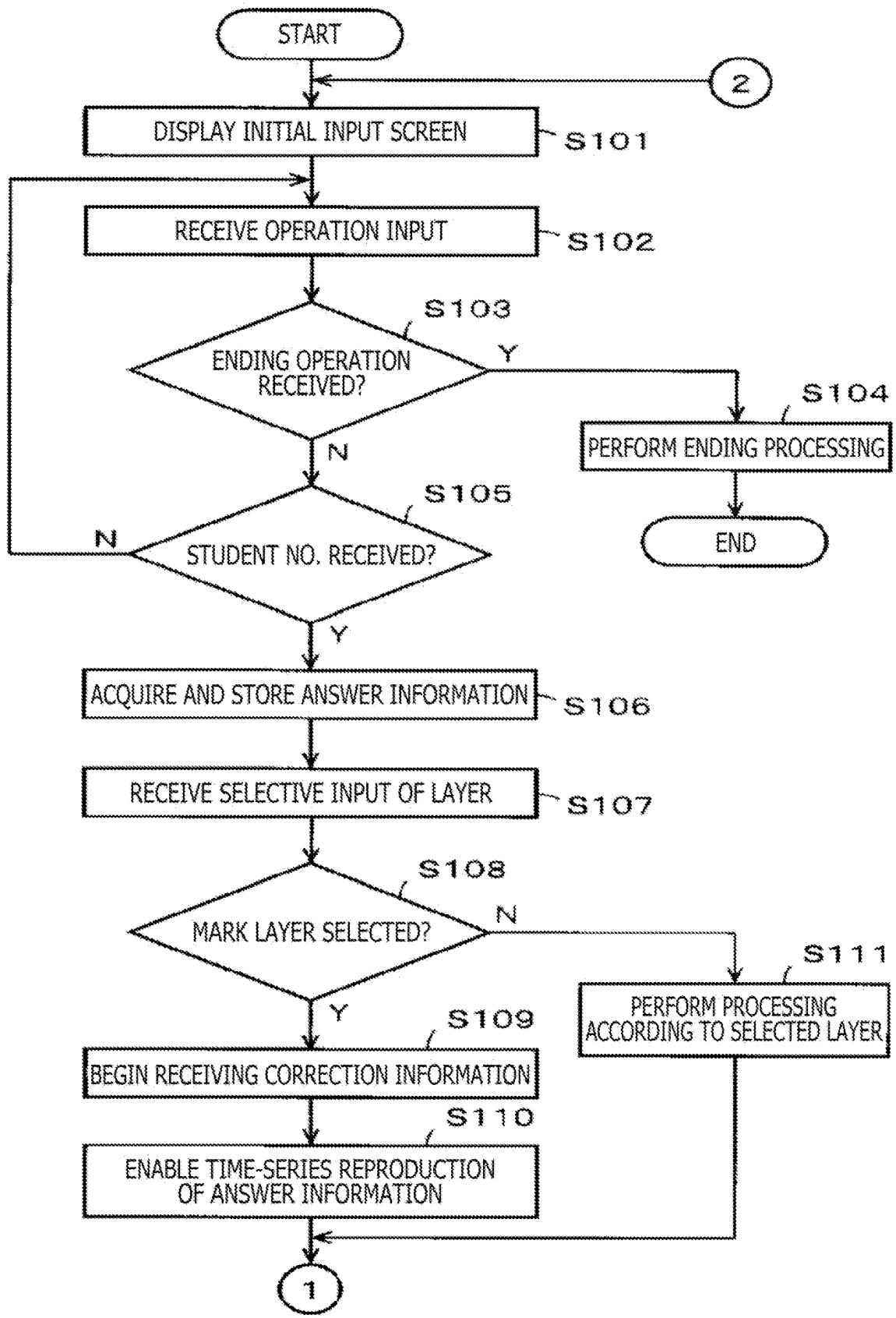
FIG. 16 is a flow chart for making a description on correction processing to be performed at the digital correction device in the second embodiment of the present disclosure.
Figure 17:
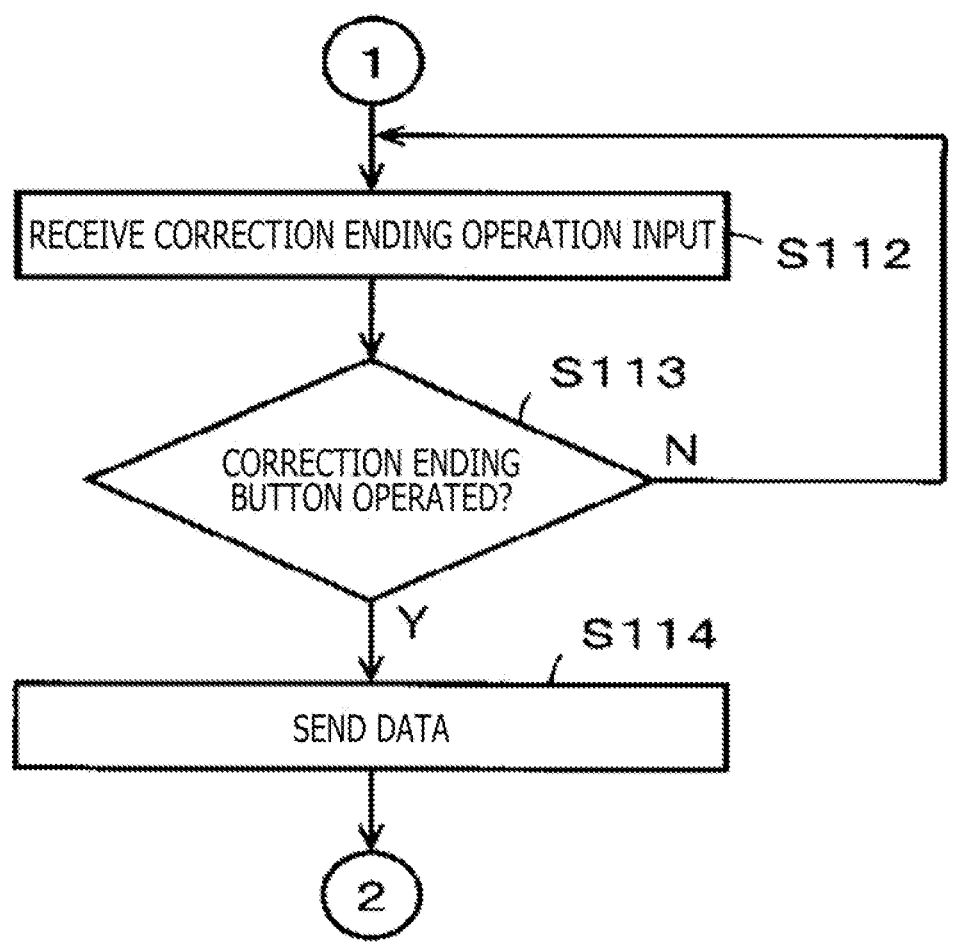
FIG. 17 is a flow chart continuing from FIG. 16.

FIGS. 16 and 17 are flow charts for making a description on correction processing to be performed at the digital correction device 7. The processing illustrated in FIGS. 16 and 17 is performed at the control circuit 702 by selecting an item corresponding to "CORRECTION PROCESSING" from a prescribed menu screen after the digital correction device 7 has been turned on.

First, the control circuit 702 displays, on the display device 704, an initial screen that receives an input of "STUDENT NO." or the like (S101), and controls to receive an operation input from the corrector (user) (S102). Subsequently, the control circuit 702 determines whether or not a predetermined ending operation such as, for example, depression of the end button displayed on the display device 704 has been received (S103). If the predetermined ending operation is determined to have been received through the determination processing at S103, the initial input screen displayed at S101 is erased, and a series of ending processing is performed to have the display screen returned to the state before the performance of the correction processing (S104), and the processing illustrated in FIGS. 16 and 17 is ended.

If the predetermined ending operation is determined not to have been received through the determination processing at S103, on the other hand, it is determined, subsequent to the reception of "STUDENT NO.," whether or not a confirmation input has been received (S105). If the confirmation input is determined not to have been received after the reception of "STUDENT NO." through the determination processing at 105, no effective operation has been performed, and the processing from S102 is repeated.

It is now assumed that through the determination processing at S105, the confirmation input is determined to have been received after the reception of "STUDENT NO." In this case, the control circuit 702 creates a request for the provision of transmittal answer information including the inputted "STUDENT NO.," transmits the request to the cloud system 5A, receives and acquires the provision of the transmittal answer information of the intended student, and stores the transmittal answer information in the external memory connected to the memory device 103 (S106).

As illustrated in FIG. 11, the control circuit 102 then displays the answer layer button LB1, mark layer button LB2 and seal layer button LB3, and receives a selective input of a layer from the corrector (user) (S107). Subsequently, the control circuit 702 determines whether or not the mark layer button LB2 has been depressed, in other words, whether or not the mark layer has been selected (S108).

If determined through the determination processing at S108 that the mark layer has not been selected, the control circuit 702 performs processing corresponding to the selected layer (S111). If the answer layer button LB1 has been selected, for example, the layer control circuitry 708 functions under control of the control circuit 702 to perform display of the answer sheet format and the answer according to the answer information on the display device 704 at S111. If the seal layer button LB3 has been selected, on the other hand, the layer control circuitry 708 functions under control of the control circuit 702 at S111 to perform display of the answer sheet format, the answer according to the answer information and the correction information on the display device 704. The control circuit 702 then enables an input to the seal layer, and receives the input of the seal information.

The mark layer is assumed to have been selected though the determination processing at S108. In this case, the control circuit 702 controls the layer control circuitry 708 to display the answer sheet format, enables the reproduction of the answer according to the answer information, and further begins to receive the correction information to the mark layer (S109). As described with reference to FIGS. 14A to 14C, the control circuit 702 then enables time-series reproduction of the answer information by the time bar TB and slider SL (S110).

After the processing at S111 or after the processing at S110, the processing proceeds to the processing at S112 of FIG. 16, and an operation input to the correction end button displayed at the predetermined position on the display device 704 is received (S112). Subsequently, the control circuit 702 determines whether or not the correction end button has been operated (S113).

If determined through the determination process at S113 that the correction end button has not been operated, the control circuit 702 repeats the processing from S112. In this case, the input of the correction information as started at S109 and the time-series reproduction of the answer information as started at S110 are continuously performed.

If determined through the determination process at S113 that the correction end button has been operated, the control 702 creates the transmittal correction information described with reference to FIG. 15, and performs processing to upload it to the cloud system 5A (S114). Subsequently, the control circuit 702 ends the correction to the answer information of the student identified by "STUDENT NO." indicated this time, and performs the processing from S101 of FIG. 16. As a consequence, it is now possible to make correction to the answer information of another student or to end the correction processing itself.

Advantageous Effects of Second Embodiment

In this second embodiment, the digital answer device 1X, owing to the use of the eraser button (left) K5L or the eraser button (right) K5R, also enables to erase a desired part with the electronic pen 2, which is dedicated for writing, without additionally providing an erase-dedicated electronic pen. Therefore, it is unnecessary to take such an action as holding an erase-dedicated electronic pen instead, so that the occurrence of such a situation as interfering with a series of thought by an erasing action can be avoided.

Further, the answer information can be created as time-series data. As a consequence, the answers can be marked by a computer and, if a need arises, the status of answering can be reproduced (reconstructed) for easy regrading or the like of the answers.

In particular, correction with the digital correction device 7 makes it possible to make marking and correction while making time-series reproduction of the answer information. By doing so, it is possible to confirm matters such as where the student stumbled, where the student made a mistake, where the student is good at, and whether the student did not make any unfair answering such as cheating. As the thought process, the status of idea and imagination, and the like can be found out from calculating equations, sketches, diagrams, texts, notes and the like included in the answer information, it is also possible to grasp, for example, that the student has genius thinking power.

As a consequence, the status of the student's attainment in learning can be confirmed. It is, therefore, possible to take an appropriate measure for every student, such as providing a lesson tailored to each student or adjusting the speed of provision of the lesson.

In addition, the use of the answer information as the time-series data also makes it possible, for example, to mark whether or not the writing order a Chinese character is correct.

Advantageous Effects Common to Embodiments

According to the digital answer devices in the first and second embodiments, the use of the operation unit makes it possible to simply and appropriately make a correction of inputted information. Further, the input process of the inputted information can be easily reproduced by creating the information as time-series data and using the time-series data. It is, therefore, possible to appropriately make the correction of the inputted information and also to appropriately reproduce the input process of the information. Accordingly, by applying the present disclosure upon conducting various examinations lead by admission examinations, the input process of each answer can be appropriately found out, and grading of the answer can be appropriately made.

[Measures if Answer Sheet Format Spans a Plurality of Pages]

In the embodiments described above, the digital answer devices 1 and 1A and the digital correction device 7 are each provided with the page change buttons K3L and K3R. If an answer sheet format spans a plurality of pages, it is, therefore, possible to perform a page change operation to display a desired one of the pages of the answer sheet format as needed, and to input an answer or to make a correction.

If an answer sheet format spans a plurality of pages as described above, the time-series data and the pages of the answer sheet format can hence be managed in association with each other for every page of the answer sheet format. In this case, the data of every students on the answer sheet format that includes the plurality of pages can be managed collectively.

FIGS. 18A to 18B illustrate a table for describing a configuration example of page-by-page answer information when an answer sheet format spans a plurality of pages, in which FIG. 18A illustrates the overall configuration of the page-by-page answer information and FIGS. 18B, 18C and 18D illustrate examples of specific answer information on every pages. Specifically, the page-by-page answer information of the examples includes so-called header information, that is, the candidate's No., subject and page number, the time-series data on the page, and the answer sheet format data for the page.

As illustrated in FIGS. 18B, 18C and 18D, the candidate Nos. and subjects in the page-by-page answer information are commonly "123456" and "mathematics," but the page numbers, time-series data and answer sheet formats are different from one page to another. Specifically, the time-series data on page 1 as the answer information the page number, of which is "1" is created to be inputted to the answer sheet format of page 1, and the answer sheet format for the page is the answer sheet format for page 1.

Similarly, the time-series data on page 2 as the answer information the page number of which is "2" is created to be inputted to the answer sheet format of page 2, and the answer sheet format for the page is the answer sheet format for page 2. Further, the time-series data on page 3 as the answer information the page number of which is "3" is created to be inputted to the answer sheet format of page 3, and the answer sheet format for the page is the answer sheet format for page 3. Page-by-page answer information is similarly created according to the page number of the answer sheet format.

The answer sheet format of page 1 is first displayed on the display portion 104 and operating the page change button K3L or K3R is operated to display the answer sheet format for a desired page, and the input of an answer can then be performed. Further, by creating the sets of page-by-page answer information illustrated in FIGS. 18B to 18D, respectively, the display of an answer sheet format and the display of an answer according to the time-series data can be performed page by page. For the sake of simplicity, it is programmed to specify a desired page by operating the page change button K3L or K3R. In this case, the page which is displayed serves as a base page, and the page before or after the base page can be specified.

If the page so specified is confirmed to be the desired page, the page-by-page answer information corresponding to the page is then read, and an answer sheet format for the page is displayed on the display device 104 by using the answer sheet format data for the page in the page-by-page answer information so read. Subsequently, the answer, which corresponds to the time-series data for the page in the page-by-page answer information so read, can be displayed in superimposition over the answer sheet format displayed on the display device 104. As is appreciated from the foregoing, each student can display an answer sheet format for a desired page and his or her corresponding inputted answer as needed, and can easily perform processing such as a correction or a change.

As is appreciated from the foregoing, even if an answer sheet format spans a plurality of pages, the answer sheet format and the time-series data can be managed page by page in association with each other, and can be managed collectively as information relating to the answer sheet format including the plurality of pages. Instead of having the page-by-page time-series data and the page-by-page answer sheet format data associated with each other as described with reference to FIGS. 18A to 18D, the page-by-page time-series data and identification (ID) numbers of the page-by-page answer sheet format data may be managed in association with each other.

In the case of the second embodiment, the processing at the time of correction can also be easily performed page by page of the answer sheet format if the answer information, the answer sheet format, the correction information and the seal information in the transmittal correction information illustrated in FIG. 15 are stored and held in association with one another and page by page of the answer sheet format.

In the embodiments mentioned above, writing pressure information is added to the time-series data created at the digital answer devices 1 and 1A, although not limited to such writing pressure information. If an electronic pen is one capable of detecting, for example, its inclination in addition to its writing pressure, information that indicates the inclination of the electronic pen may be added. If an electronic pen is provided with a so-called side switch, information that indicates the state of the side switch may also be added.

The side switch included in the electronic pen can also be provided, for example, with functions as the eraser buttons included in the digital answer devices 1 and 1A. More specifically, for example, the frequency of a signal to be delivered from the electronic pen is changed depending on whether or not the side switch is pressed or not. By doing so, it is possible to determine on the side of an input device such as the digital answer device that writing is being conducted with the electronic pen when the side switch is not pressed or erasing is conducted with the electronic pen when the side switch is pressed.

[Modifications]

The first and second embodiments are described as those which generate answer information at every predetermined timing during an examination, but are not limited to them. For example, answer information in which the X-coordinate Xn, Y-coordinate Yn, writing pressure Pn and button status Sn are all "0 (zero)" may not be included in transmittal answer information.

Instead of generating answer information at every predetermined timing, answer information may be generated if an operation input by the electronic pen 2 or an operation to an operation button is performed. More specifically, it may be programmed such that the time-series data generation circuitry 107 acquires timepoint information from the clock circuit 108 and generates answer information if a pointed position or a writing pressure is outputted from the position detection circuitry 105B or if information indicating an operated button is outputted from the operation unit 106.

In the above-mentioned embodiments, the provision of necessary information such as an answer sheet format and examination questions is programmed to be received from the cloud system 5 or 5A, although not limited to such a configuration. For example, an answer sheet format and examination questions may be stored and distributed in an external memory that can be inserted in a memory slot of the memory device 103, and may be displayed and used at the digital answer device 1 or 1A. In addition, answer information may be stored in the distributed external memory, which may then be collected to make marking and correction.

In the above-mentioned embodiments, the position detection devices 105 and 705 are of an electromagnetic induction exchange type, although not limited to such an electromagnetic induction exchange type. For example, capacitive position detection devices, which enables an input of information by an electronic pen, may be used. As another alternative, position detection devices of a type other than the electromagnetic induction exchange type or capacitive type may also be used.

Only as questions, those which are printed on a paper medium may be distributed to candidates or students. As an alternative, questions may be projected on a large screen at each examination venue to commonly provide them to candidates.

In the above-mentioned digital answer device 1, the current time provided by the clock circuit 108 may be displayed on the display device 104, because the ending time of an examination is important information for candidates. At the end of an examination, the input may be automatically restricted, and time-series data as answer information may be automatically transferred.

The digital correction device 7 in the second embodiment has an important feature in that the history of answering can be reproduced and displayed following a movement of the slider SL on the time bar TB. Therefore, instead of using the digital correction device 7 dedicated for correction work, a digital correction device can also be realized by mounting functions, with which the digital correction device 7 is provided, on a general-purpose personal computer.

In this case, the time bar TB and slider SL are displayed on a display screen of the personal computer, and the slider SL on the time bar TB is moved by keyboard operation or by operation of a pointing device such as a so-called mouse. Following a movement of the slider SL, time-series data as the history of answering is then reproduced and displayed. In this manner, functions corresponding to those of the digital correction device 7 can be realized using the general-purpose personal computer.

For inputting correction information through the general-purpose personal computer used as a digital correction device, an external digitizer connectable to the personal computer may be used. The digitizer in this case is a device constructed, for example, of a position detection sensor of an electromagnetic coupling type and a position detection circuitry that enables the detection of a pointed position based on output signals from the position detection sensor, and has a configuration illustrated in FIG. 5.

In the second embodiment, the slider SL may be arranged as a hardware operating device at a suitable position on the digital correction device 7. As another alternative, the slider SL may be arranged independently as an operating device discrete from the digital correction device 7, and may be connected and used through a digital interface of a USB specification.

The first and second embodiments are described taking, although not limited to, the cases in which the present disclosure is applied by way of example to the examination system and distance learning system. For example, the present disclosure can be applied to a medical records management system employed by a hospital. More specifically, template data of medical records is created, and the template for the medical records is displayed on a display device of a medical record input device having a similar configuration as the above-mentioned digital answer device. An input of information is then performed for every patient with an electronic pen. A medical records management system can then be constructed by managing the template for medical records and the time-series data of every patients in association with each other.

Further, the present disclosure can also be applied to a manufacture information management system employed by a factory. More specifically, template data of a production process chart is created, and the template data of the production process chart is displayed on a display device of a process information input device having a similar configuration as the above-mentioned digital answer device. Information on the work status or the like in every step for every product is inputted with an electronic pen. A manufacture information management system can then be constructed by managing the template format for the production process chart and the time-series data of every step for every product in association with each other.

As the input devices used in the above-described medical records management system and manufacture information management system, display-equipped portable terminals (so-called tablets) for electronic pen input are most suited because nurses and process chart supervisors are presumed to carry with them in many instances. Templates for every patient's rooms and every steps in the factory can be wirelessly transmitted to the portable terminals (tablets), can be filled in with an electronic pen, and can then be transmitted back.

In this manner, the present disclosure can be applied to various systems which can create various templates without being limited to answer sheet formats, can display the templates on the display screens of input devices, can perform an input of information with an electronic pen, and can manage the templates and the time-series data in association with each other.

[Others]

As is also appreciated from the description of the first and second embodiments, the description of the claims and the description of the embodiments can be associated with each other as will be described below. The functions of the sensor in the digital input device (hereinafter simply referred to as "the digital input device") in the claims are realized by the position detection device 105 constructed of the position detection sensor 105A and position detection circuitry 105B in the digital answer device 1 in the first embodiment (hereinafter simply referred to as "digital answer device 1"). The functions of the display device in the digital input device are realized by the display device 104 of the digital answer device 1, and the functions of the display processor and first and second display processors in the digital input device are realized by the cooperation of primarily the control circuit 102 and the display device 104 in the digital answer device 1. The functions of the operation unit in the digital input device are realized by the operation unit 106 in the digital answer device 1, and the functions of the time-point information providing unit in the digital input device are realized by the clock circuit 108 in the digital answer device 1.

Further, the functions of the time-series data generation in the digital input device are realized by the time-series data generation circuitry 107 in the digital answer device 1. The functions of the first and second storage devices in the digital input device are realized, for example, by the nonvolatile memory arranged in the control circuit 102 and the internal memory and external memory of the memory device 103, and the functions of the receiving device and sending device in the digital input device are realized by the sending and receiving antenna 101A and wireless communication device 101 in the digital answer device 1. The functions of the second storage device in the digital input device are realized, for example, by the internal memory or external memory of the memory device 103.

On the other hand, the functions of the second sensor in the digital correction device (hereinafter simply referred to as "the digital correction device") in the claims are realized by the position detection device 705 constructed of the position detection sensor 705A and position detection circuitry 705B in the digital correction device 7 in the second embodiment (hereinafter simply referred to as "digital correction device 7"). The functions of the second display device in the digital correction device are realized by the display device 704 in the digital correction device 7, and the functions of the third display processor in the digital correction device are realized by the display device 704 in the digital correction device 7.

Further, the functions of the correction information creator in the digital correction device are realized primarily by the control circuit 702 in the digital correction device 7, and the functions of the fourth display processor in the digital correction device are realized by the control circuit 702 in the digital correction device 7. The functions of the third and fourth storage devices in the digital correction device are realized by the internal memory or external memory of the memory device 703 in the digital correction device 7, and the functions of the reproduction instructing device in the digital correction device are realized by the time bar TB and slider SL in the digital correction device 7.

While the preferred embodiments have been described above, it should be understood that the embodiments are illustrated by way of example only and various many changes and modifications may be made therein without departing from the scope of the appended claims.

What is claimed is:

1. A digital input device comprising:
   a sensor which, in operation, detects an electronic pen and outputs coordinates according to a position pointed by the electronic pen;
   a display device disposed on a side of the sensor;
   at least one operation button;
   at least one processor; and
   at least one storage device storing at least one program that, when executed by the at least one processor, causes the digital input device to:
   display, on the display device, a predetermined template according to a format indicated by template data and inputted information according to the position pointed by the electronic pen and received via the sensor;
   provide timepoint information at each of a plurality of timepoints;

generate a plurality of pieces of time-series data based on the timepoint information provided at each of the timepoints, each of the pieces of the time-series data including:
- a timepoint value indicated by the timepoint information,
- coordinate values indicated by the coordinates output from the sensor,
- a writing pressure value indicated by information received from the electronic pen, the writing pressure value indicating a pressure applied to the electronic pen in response to determining that the information indicates that the pressure is applied to the electronic pen, and the writing pressure value indicating that no pressure is applied to the electronic pen in response to determining that the information indicates that no pressure is applied to the electronic pen, and
- a button status value indicating a state of the at least one operation button; and store answer information and correction information in association with the template data indicating the format of the template, the answer information being different from the correction information, the answer information including the pieces of the time-series data in which the button status value has a first value, and the correction information including the pieces of the time-series data in which the button status value has a second value that is different from the first value.

2. The digital input device according to claim 1, wherein the at least one processor includes a first display processor programmed to display the predetermined template on the display device and a second display processor programmed to display, on the display device, the inputted information according to the position pointed by the electronic pen and received via the sensor.

3. The digital input device according to claim 1, wherein: the template includes a plurality of pages, and
the at least one program, when executed by the at least one processor, causes the digital input device to collectively store each page of the template in association with the time-series data corresponding to the page.

4. The digital input device according to claim 1, wherein: the predetermined template has an answer sheet format for receiving answers to an examination, and
the digital input device functions as a digital answer sheet preparation device.

5. The digital input device according to claim 1, wherein: the at least one operation button is an eraser button that is operated when an input is made to erase the inputted information, and
the at least one processor is programmed to regard, as an erasing operation for the inputted information, an operation to the template by the electronic pen while the eraser button is depressed, and to erase the displayed information in a range of the operation by the electronic pen.

6. The digital input device according to claim 1, wherein: the at least one operation button includes two operation buttons, the two operation buttons are eraser buttons, a desired one of the eraser buttons is operated when an input is made to erase the inputted information, and the eraser buttons are arranged on opposite sides of the display device, and
the at least one processor, in operation, regards, as an erasing operation for the inputted information, an operation to the template by the electronic pen while the desired one of the eraser buttons is depressed, and erases the displayed information in a range of the operation by the electronic pen.

7. The digital input device according to claim 1, wherein: the at least one operation button is a back button to return to a last input state, and
the at least one processor, when the back button is depressed, erases an input image according to an inputting operation performed immediately before the back button is depressed.

8. The digital input device according to claim 1, wherein: the at least one operation button includes two operation buttons,
the two operation buttons are back buttons, a desired one of back buttons is operated when returning to a last input state is desired, and the back buttons are arranged on opposite sides of the display device, and
the at least one processor, when the desired one of the back buttons is depressed, erases an input image according to an inputting operation performed immediately before the desired one of the back buttons is depressed.

9. The digital input device according to claim 1, wherein: the template has an answer sheet format including questions, and
the at least one processor, in operation, displays the answer sheet format, which includes the questions, as the template on the display device.

10. The digital input device according to claim 1, wherein: the at least one storage device stores the answer information and correction information in association with the template data indicating the format of the template.

11. The digital input device according to claim 1, further comprising:
a receiver which, in operation, receives the template data indicating the format of the template,
wherein the at least one storage device stores the template data indicating the format of the template received by the receiver.

12. The digital input device according to claim 1, further comprising:
a transmitter which, in operation, transmits the answer information and correction information stored in association with the template data indicating the format of the template to an intended partner.

13. The digital input device according to claim 1, wherein the at least one storage device includes a first storage device that stores the answer information and correction information in association with the template data indicating the format of the template, and that is incapable of rewriting data stored therein, and is configured to be detachable relative to the digital input device.

* * * * *